United States Patent [19]

Suzuki et al.

[11] Patent Number: 5,423,643
[45] Date of Patent: Jun. 13, 1995

[54] TOOL CLAMPING/UNCLAMPING DEVICE

[75] Inventors: Shigeru Suzuki, Kawasaki; Motonori Kobara; Yasuhiro Hisatomi, both of Futtu; Yoshinori Yamaguchi, Yamatokoriyama; Hiroshi Yonetani, Yamatokoriyama; Kiyoyuki Fukushima, Yamatokoriyama; Yoshimasa Sakamoto, Yamatokoriyama; Toru Yagami, Yamatokoriyama; Toshihide Kamei, Yamatokoriyama; Takahiro Kobi, Yamatokoriyama; Yoshiaki Sugimoto, Yamatokoriyama; Nobuyuki Kimura, Yamatokoriyama, all of Japan

[73] Assignees: Kuroda Seiko Co., Ltd., Kawasaki; Mori Seiki Co., Ltd., Yamatokoriyama, both of Japan

[21] Appl. No.: 25,252

[22] Filed: Mar. 2, 1993

[30] Foreign Application Priority Data

Mar. 4, 1992 [JP] Japan .................................. 4-082720
Aug. 28, 1992 [JP] Japan .................................. 4-230004
Jan. 20, 1993 [JP] Japan .................................. 5-007521

[51] Int. Cl.6 .............................................. B23C 5/26
[52] U.S. Cl. ........................................ 409/232; 279/91; 408/239 R
[58] Field of Search ............... 483/1, 13, 15; 409/232, 409/234; 408/239 R; 279/90, 91

[56] References Cited

U.S. PATENT DOCUMENTS 3,680,436  8/1972  Marsland ........................ 409/232

FOREIGN PATENT DOCUMENTS 0273834  7/1988  European Pat. Off. ........... 483/13

Primary Examiner—Z. R. Bilinsky
Attorney, Agent, or Firm—Varndell Legal Group

[57] ABSTRACT

This invention provides a tool clamping/unclamping device which allows a tool to be replaced simply and securely by another one in short time, and which prevents a lock nut from being loosened, from yielding a difference in phase, and from dropping off with respect to a main shaft. The tool clamping/unclamping device comprises a tool urging means for holding a tool holding member in its clamped state, a nut positioning means for adjusting the lock nut in its phase in rotation angle position with respect to the main shaft, a nut drop-off preventing means for regulating the amount of rotation angle of the nut, a nut loosening detection means for detecting the position of the nut in the direction of the main shaft, and/or a locking mechanism for engaging a steel ball urged by a spring with a lock hole to thereby lock the lock nut in the direction of rotation. Further, for a hollow main shaft, a relay member is attached thereto, the relay member being formed similarly to the lower end portion of the solid main shaft.

5 Claims, 24 Drawing Sheets

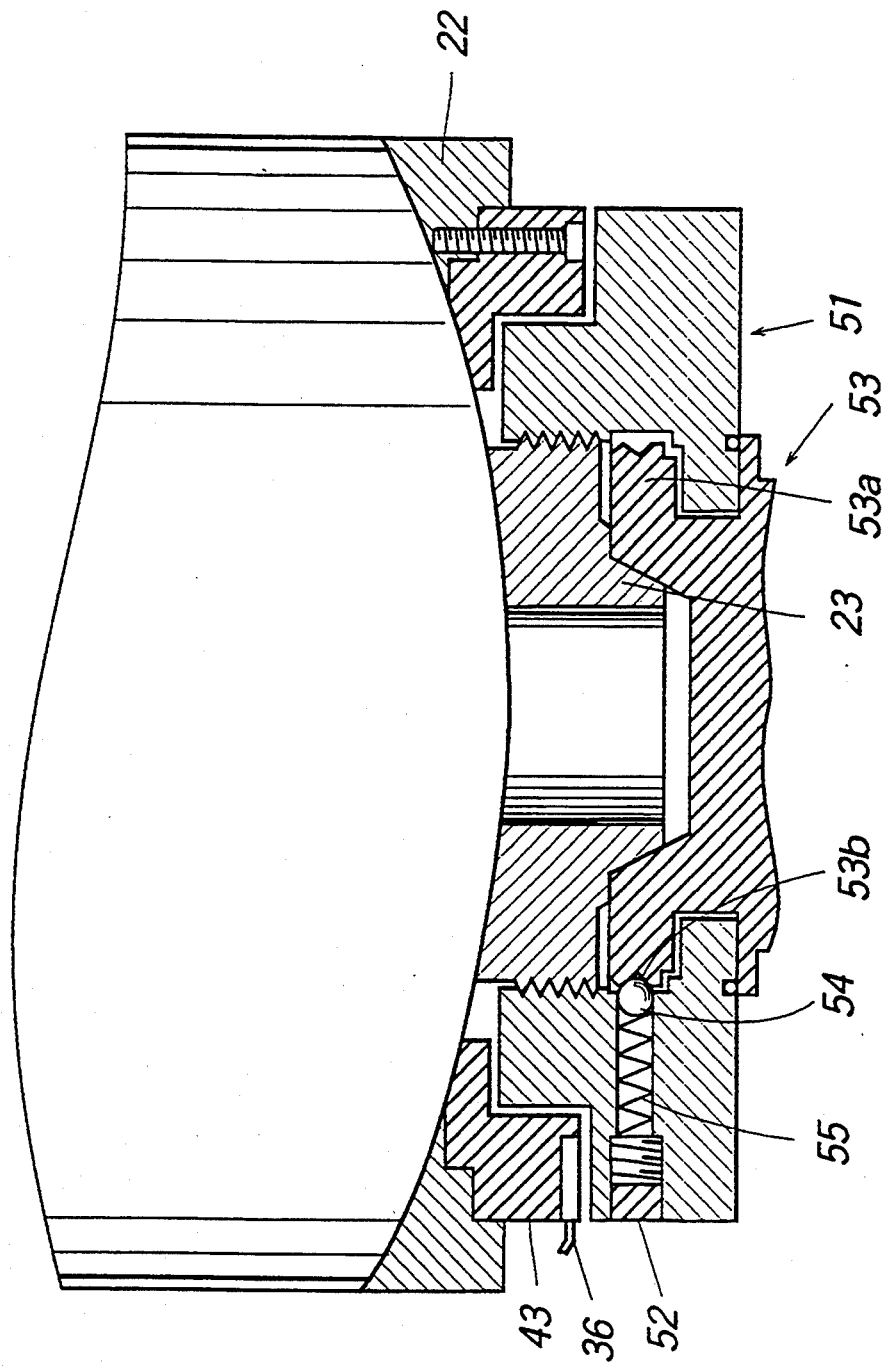

TOOL CLAMPING/UNCLAMPING DEVICE

BACKGROUND OF THE INVENTION

1. Field of the Invention

The present invention relates to tool clamping/unclamping devices used for replacing a tool in a machining center or other various types of machine tools. More specifically, the invention relates to a tool clamping/unclamping device of the so-called nut runner system in which a tool holder is fixed at the main shaft of a machine tool with lock nuts.

2. Description of Related Art Statement

This type of tool clamping/unclamping device conventionally available is disclosed, for example, in Japanese Patent Publication No. 4324/3. This device, as shown in FIG. 1, has a main shaft 2 rotatably inserted into a main shaft unit 1. At a lower end portion of the main shaft 2, a tool holder 4 is removably clamped by a tool clamping/unclamping device 3. This tool clamping/unclamping device 3 comprises a lock nut 5 screwed to the lower end of the main shaft 2, and a locking mechanism 6 for locking the lock nut 5 in the direction of rotation. The lock nut 5, cylindrically shaped, has a lock hole 5a concavely provided halfway on its outer circumferential face and a plurality of urging pieces 5b inwardly protrusively provided at the lower end of its inner circumferential face.

The locking mechanism 6, comprising a cylinder 7 and a hydraulic feed system 8 for connecting the cylinder 7 to a hydraulic source, is so arranged that a piston rod 9 disposed as inserted within the cylinder 7 is advanced so as to be fitted into the lock hole 5a of the lock nut 5, thereby locking the lock nut 5 in the direction of rotation. In addition, outward of the lock nut 5 is disposed a position sensor 10 for detecting the angular position of the lock nut 5.

The tool holder 4 has an edge tool T fitted thereto. The tool holder 4 also has at its flange portion 4a a plurality of keyways 4b so that the keyways can be fitted to a power transmission key 11 attached to the lower end of the main shaft 2. The flange portion 4a is urged by the urging pieces 5b of the lock nut 5.

On the outer circumferential face of the tool holder 4, a gripping groove 4c is formed into an annular shape and is to be held by an exchange arm, which is not shown.

Next, the operation of tool replacement by this prior-art device is described with reference to FIG. 2.

(1) The gripping groove 4c of the tool holder 4 is gripped by the exchange arm (step S1);

(2) The main shaft 2 is rotated at a low speed and positioned by the position sensor 10 so that the lock hole 5a on the outer circumferential face of the lock nut 5 and the piston rod 9 of the locking mechanism 6 coincide with each other (step S2);

(3) Then, the piston rod 9 of the locking mechanism 6 goes ahead so as to be engaged with the lock hole 5a of the lock nut 5, so that the lock nut 5 is locked in the direction of rotation (step S3);

(4) In this locking state, the main shaft 2 rotates, causing the lock nut 5 to be loosened, so that the notches of the tool holder 4 are engaged with the urging pieces 5b of the lock nut 5 (step S4);

(5) With the tool holder 4 gripped by the exchange arm, the arm goes down, where the tool holder is replaced by a new one, then the arm goes up (steps S5–S7);

(6) When the new tool holder 4 is fitted in the lock nut 5, the main shaft 2 rotates in the direction reverse to that in step S4 with the lock nut 5 locked, causing the lock nut 5 to securely tighten the tool holder 4 (step S8); and (7) Thereafter, the piston rod 9 of the locking mechanism 6 retreats so as to release the lock nut 5 from locking, and finally the exchange arm returns to the standby position inversely to step S2 (steps S9 and S10).

However, in the above-described prior art, to prevent the tool holder 4 from dropping off by its dead weight when the lock nut 5 is loosened to its removal position, it is arranged that the clamping and unclamping of the tool holder 4 is carried out by rotating the main shaft 2 with the tool holder 4 first gripped by the exchange arm, as understood from operation of tool replacement shown in FIG. 2. Thus, the operation of the exchange arm cannot be exercised in any continuous manner. This would require longer time for the operation of tool replacement, unfavorably.

When there arises a shift in the phase relation between the lock nut 5 and the main shaft 2 with the tool unclamped, it is required to make the power transmission key 11 of the main shaft 2 and the urging pieces 5b of the lock nut 5 coincident in phase by manually rotating the lock nut 5. This phase adjustment work may encounter difficulties.

Besides, when the main shaft 2 is rotated at high speed with the tool unclamped, there would be a possibility that the lock nut 5 might drop off from the main shaft 2 due to excessive rotation of the lock nut 5. Still another problem is that the state of how the tool holder 4 is held by the lock nut 5 cannot be checked during the rotation of the main shaft 2.

On the other hand, whereas the above-described prior art would involve the position sensor 10, the location where the position sensor 10 is disposed is necessarily in proximity to the cutting point from some structural reason. This leads to a possibility that some failure or malfunction may occur due to chips or others. Moreover, in machines of such a type that the main shaft 2 is replaced in the whole unit including its attachments, it would be difficult in some cases to provide electrical wiring required to operate the position sensor 10.

Further, it is arranged that the position of the protrusion of the lock nut 5 is detected by the position sensor 10 while the main shaft 2 is rotated at low speed, thereby accomplishing the alignment between the lock hole 5a and the piston rod 9. As a result, a longer time would be taken for the work of tool replacement.

Yet further, due to the arrangement of the locking mechanism 6 that the piston rod 9 is moved by a hydraulic cylinder or the like, the whole system becomes complex and expensive, adding to the work of maintenance and inspection and the like.

Furthermore, due to the arrangement that the main shaft 2 is rotated by a specified angle, the thickness of the flange portion 4a of the tool holder 4 to be clamped by the lock nut 5 is not equal in all cases of the tool holder 4. Also, due to possible abrasion of the screw over a long term use, a significant variation in the clamping force may take place, such that chatters, edge damage, and the like may occur during machining processes. As a result, the machining precision may be adversely affected to a great extent, unfavorably.

The nut runner type device mentioned before would require a male screw 2a to be provided to screw the lock nut 5 to an end of the main shaft 2. Thus, it cannot be utilized for general purposes, disadvantageously. This type of device also involves a lengthened taper portion 2b, such that the tool holder 4 needs to be moved over a considerable distance to be withdrawn completely from the main shaft 2 during tool replacement. This would result in making it difficult to speed up the operation of automatic tool replacement.

SUMMARY OF THE INVENTION

It is therefore an object of the present invention to provide a tool clamping/unclamping device which is capable of reducing the time required for the operation of tool replacement, facilitating the phase adjustment of the lock nut, preventing the lock nut from dropping off, checking how the tool is held by the lock nut during the rotation of the main shaft, and allowing the close-contact end faces of the main shaft and the tool holder to be cleaned.

It is another object of the invention to provide a tool clamping/unclamping device which requires no position sensor and which is capable of replacing a tool positively, without the need of providing a complex mechanism including a solenoid valve and a hydraulic cylinder for operating the locking mechanism and yet without the possibility of malfunction in short time, by virtue of its uniform clamping force.

It is yet another object of the invention to provide a tool clamping/unclamping device which is capable of implementing tool replacement with ease and high speed and being constant in the tool clamping force and high in the levels of machining precision, tool rigidity, safety, and the like.

BRIEF DESCRIPTION OF THE DRAWINGS

These objects and features of the present invention will become apparent from the following description taken in conjunction with the preferred embodiment thereof with reference to the accompanying drawings, in which:

FIG. 10 is an enlarged view of the main part of a tool urging means of a second embodiment of the invention;

DETAILED DESCRIPTION OF THE PREFERRED EMBODIMENTS

Figure 3:
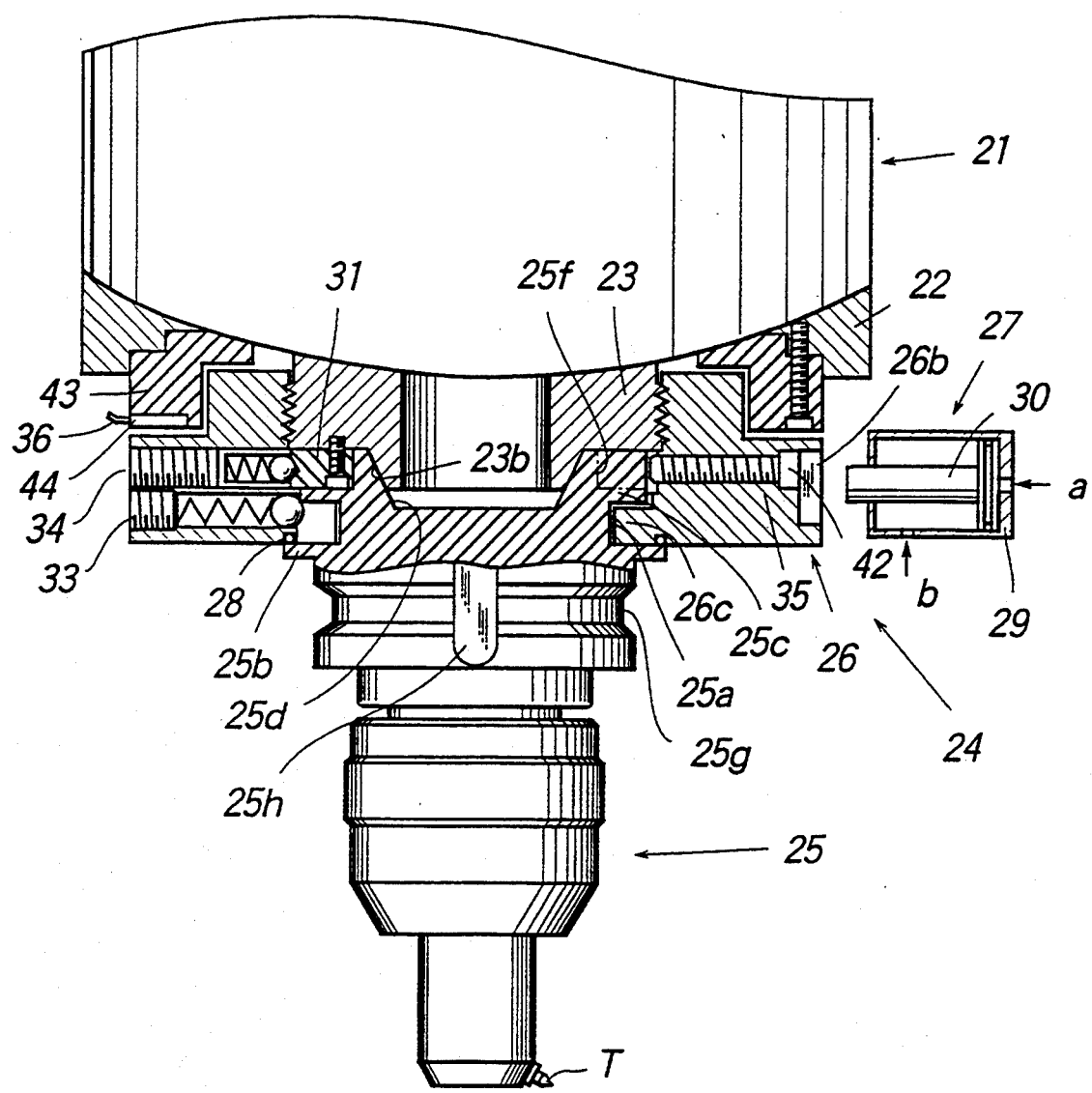
FIG. 3 is a side view partly in section of a first embodiment according to the present invention.
Figure 4:
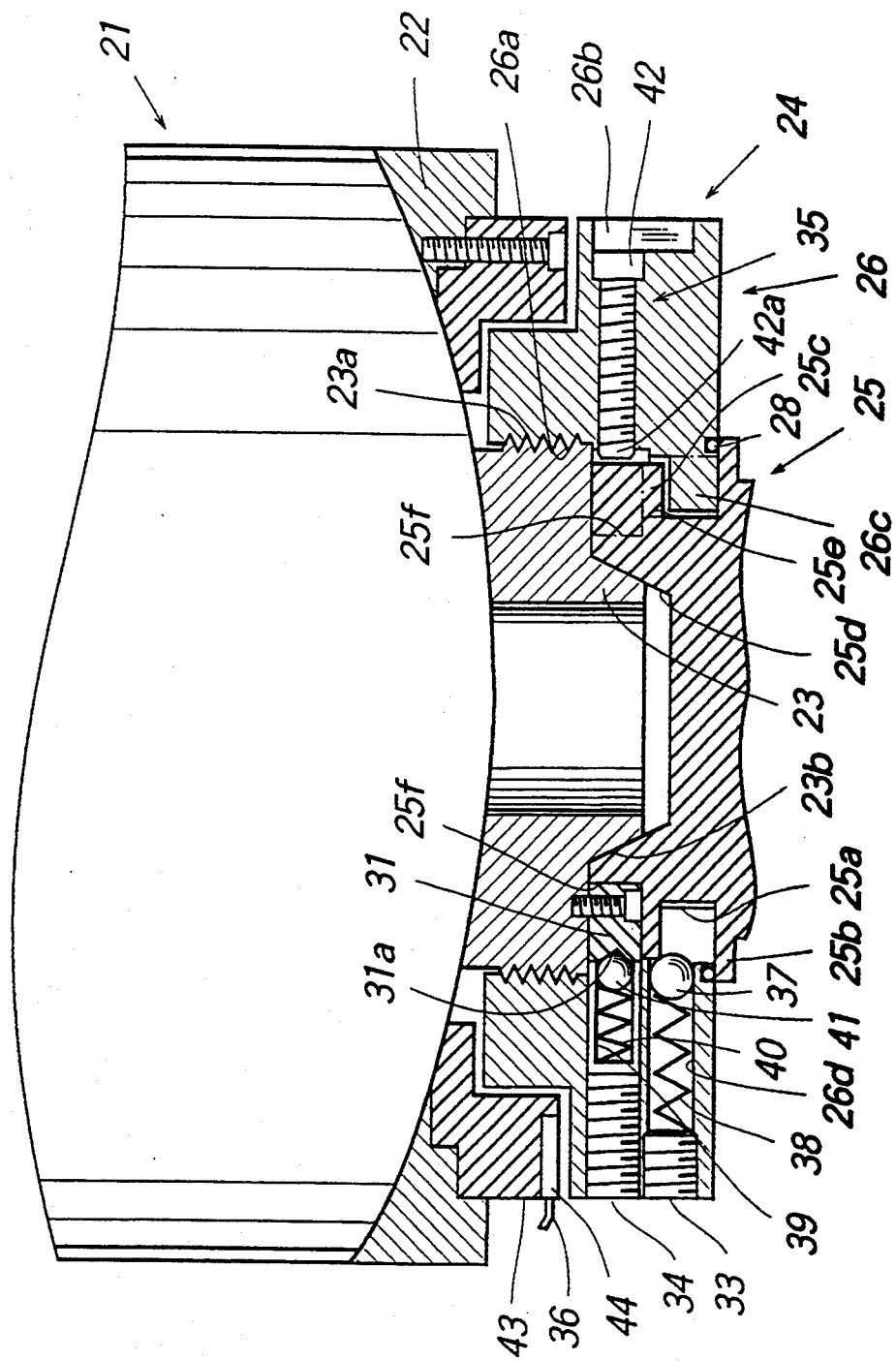
FIG. 4 is an enlarged sectional view of the main part of FIG. 3.
Figure 5:
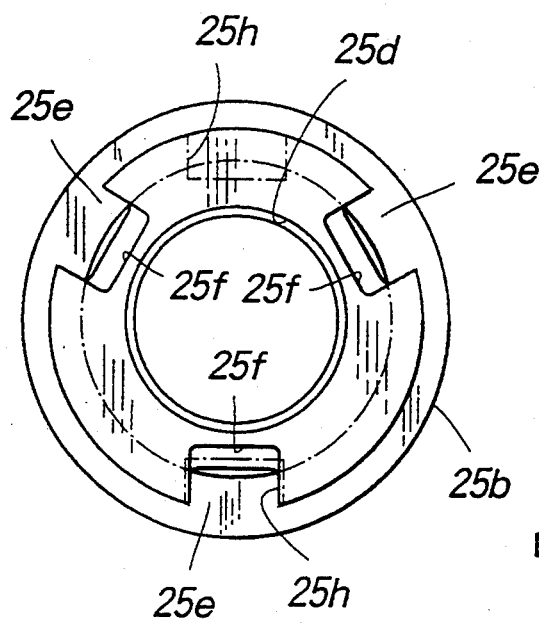
FIG. 5 is a plan view of a tool holder.
Figure 6:
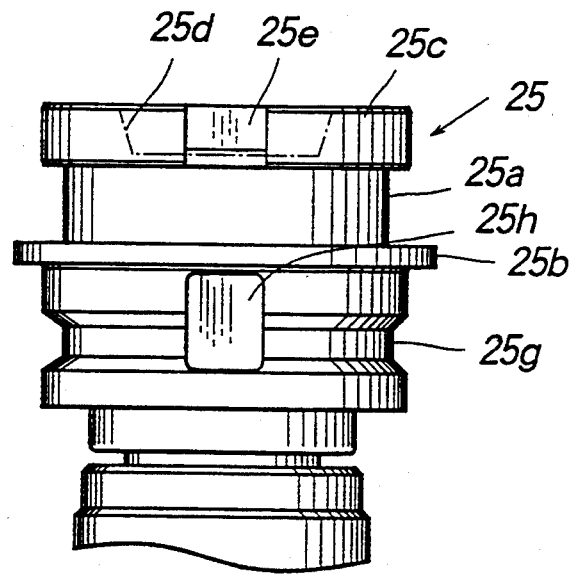
FIG. 6 is a side view of the tool holder.

The present invention is now described in more detail in conjunction with embodiments thereof illustrated in FIGS. 3 and following of the accompanying drawings.

FIGS. 3 through 7 are views for explaining the tool clamping/unclamping device according to a first embodiment of the present invention. Referring to the figures, at the lower end face of a main shaft 23 rotatably installed in a housing 22 for a main shaft unit 21, a tool holder 25 is removably clamped by a tool clamping/unclamping device 24. This tool clamping/unclamping device 24 comprises a lock nut 26 screwed at the lower end of the main shaft 23, and a locking mechanism 27 for prohibiting the lock nut 26 from rotating.

The lock nut 26 is of an approximately cylindrical shape and has a female screw 26a, which is to be screwed to a male screw 23a of the main shaft 23, formed at an upper portion of its inner circumferential face, as well as a lock hole 26b concavely provided on its outer circumferential face. Also, at a lower end portion of the inner circumferential face of the lock nut 26, there are three urging pieces 26c inwardly protrusively provided at equal angular intervals. In addition, on the bottom face of the lock nut 26 rather close to its center, there is mounted an O-ring 28 for preventing contaminations from invading into an urging groove 25a of the tool holder 25, the O-ring 28 being urged into contact with a sealing-use flange 25b of the tool holder 25.

The locking mechanism 27, having a cylinder 29, is connected with a hydraulic feed system, not shown, for feeding hydraulic oil in the direction of arrow a or b. This locking mechanism 27 is so arranged that a piston rod 30, which is disposed as inserted into the cylinder 29, is made to protrude by a hydraulic pressure of operating fluid fed in the direction of arrow a so that the top of the piston rod 30 is fitted into the lock hole 26b of the lock nut 26, thus prohibiting the lock nut 26 from rotating. In addition, although not shown, a position sensor for detecting the angular position of the lock nut 26 is disposed outward of the lock nut 26.

At the upper end of the tool holder 25, a flange 25c is integrally formed therewith. Inside the flange 25c, a female taper 25d is formed so as to be fitted into a male taper 23b of the main shaft 23. The flange 25c has notches 25e formed in correspondence to the urging pieces 26c, the notches 25e serving as recesses for the urging pieces 26c so as to be inserted thereinto for alignment with the urging pieces 26c provided to the lock nut 26. An upper portion of the notches 25e is formed into a keyway 25f, three in number, which is to be engaged with a power transmission key 31 fixed at an end face of the main shaft 23 to transmit rotating force. Also, at the lower side of the flange 25c the urging groove 25a is concavely provided so as to allow the urging pieces 26c to urge the upper face of the urging groove 25a, i.e. the lower face of the flange 25c.

On the outer circumferential face of the tool holder 25, a gripping groove 25g is formed in an annular shape to be held by a grip 32a of a later-described exchange arm 32. Further on this outer circumferential face, a pair of engagement grooves 25h for positioning are disposed, deeper than the gripping groove 25g, so as to be opposed to each other with the axis line therebetween.

The lock nut 26 comprises a tool urging means 33 for urging and holding the tool holder 25 in its clamped state, i.e. upward as illustrated in the figure, a nut positioning means 34 for positioning, or adjusting in phase, the lock nut 26 with respect to the main shaft 23; a nut drop-off preventing means 35 for regulating the amount of rotation angle of the lock nut 26 with respect to the main shaft 23; and a nut loosening detection means 36 for detecting the axial position of the lock nut 26 with respect to the main shaft 23.

The tool urging means 33 is provided in three sets at equal angular intervals with a view to avoiding the urging pieces 26c of the lock nut 26. Each set of the tool urging means 33 acts to urge a steel ball 37 radially inwardly of the main shaft 23 with a spring 38 against a guide groove 26d formed at the lower end of the lock nut 26 so that it penetrates therethrough in the direction perpendicular to the axis. In this tool urging means 33, it is arranged so that the steel ball 37 is engaged with an upper corner portion of the urging groove 25a of the tool holder 25 so as to urge the tool holder 25 upward.

The nut positioning means 34, being provided in one set upward of the tool urging means 33, is so arranged that a spring 40 provided inside a cylindrical member 39 urges a steel ball 41, as in the tool urging means 33. In this nut positioning means 34, it is arranged so that the steel ball 41 is to be engaged with a concave portion 31a provided to the power transmission key 31 at a position where the urging pieces 26c of the lock nut 26 and the notches 25e of the tool holder 25 coincide with each other.

The nut drop-off preventing means 35 is so arranged that a rotation regulating bolt 42 is screwed at a portion on the opposite side of the nut positioning means 34 so as to protrude into the inner face of the lock nut 26, thus allowing the resultant protruding portion 42a to be in contact with the power transmission key 31.

The nut loosening detection means 36 has such a structure that to a lower end cover 43 fixed at the lower end of the housing 22 is mounted a clearance sensor 44 for detecting the amount of clearance thereof with respect to the upper end face of the lock nut 26. In this nut loosening detection means 36, it is arranged so that the amount of clearance between the clearance sensor 44 and the upper end face of the lock nut 26 at the time when the lock nut 26 has been completely tightened is detected and stored by the clearance sensor 44, and when the amount of clearance between the clearance sensor 44 and the lock nut 26 exceeds a specified value, the sensor generates a loosening detection signal.

Figure 7:
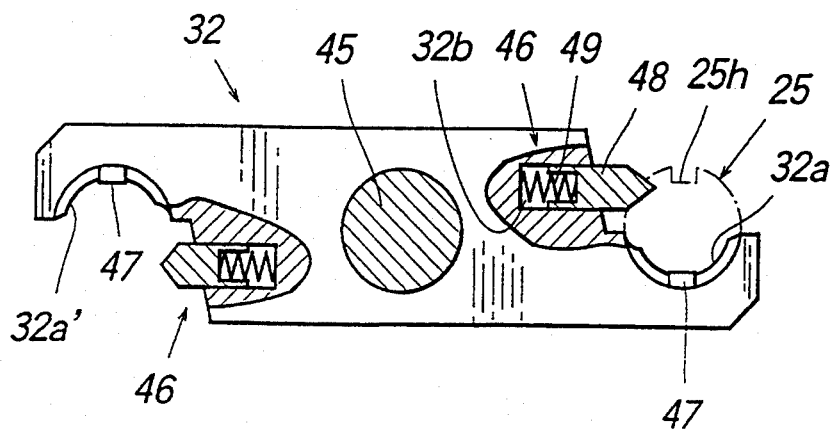
FIG. 7 is a plan view partly in section of an exchange arm.

Referring to FIG. 7, the exchange arm 32 is a strip-plate shaped one fixedly held to an exchange shaft 45 and adapted to be turnable with the exchange shaft 45 and movable in the axial direction. At both ends of the exchange arm 32 there are provided a circular grip 32a, 32a' to be fitted to the gripping groove 25g of the tool holder 25, a tool holding mechanism 46, and an engagement key 47 for prohibiting the tool holder 25 from rotating. The tool holding mechanism 46 urges the tool holder 25 fitted to the grip 32a of the exchange arm 32 to thereby hold the tool holder 25. The tool holding mechanism 46 is so arranged that a holding member 48 is disposed so as to be inserted into a holding cylinder 32b concavely provided to the exchange arm 32 and besides the holding member 48 is urged to the tool holder 25 by a spring 49.

Figure 8:
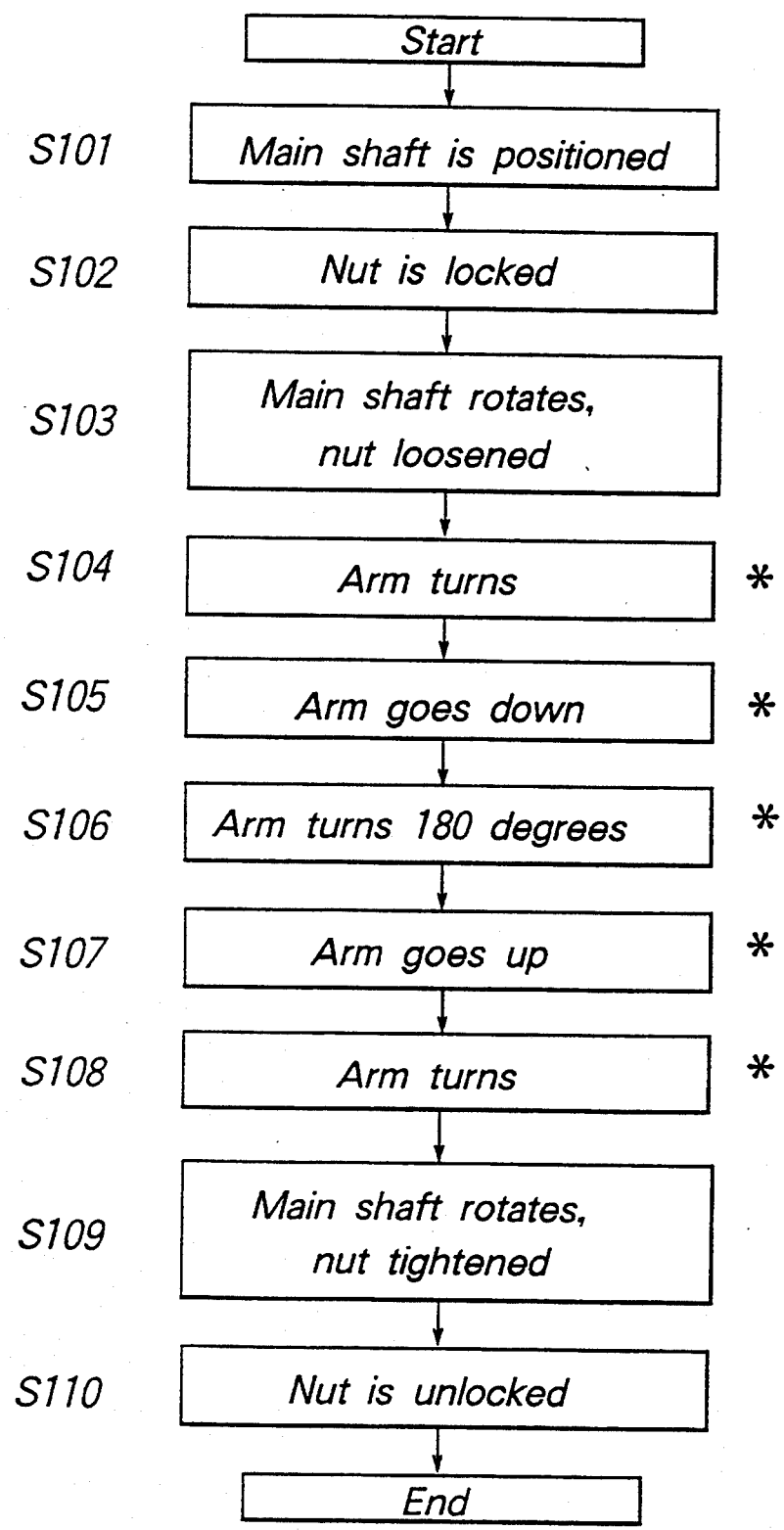
FIG. 8 is a flowchart for explaining the operation.

Following is the description of the operation of tool replacement with reference to the relevant drawings, based on the flowchart of FIG. 8 and the schematic view of FIG. 9.

Figure 9A:
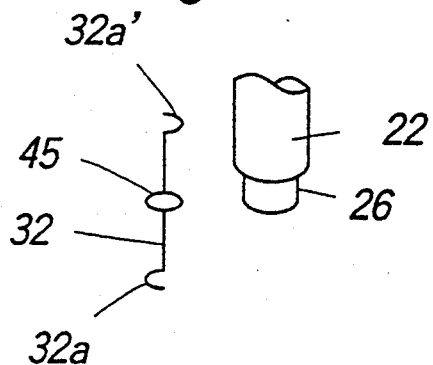
FIGS. 9(a) to 9(f) are schematic process views, for explaining the operation.
Figure 9D:
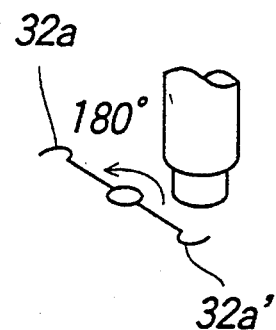
Figure 9B:
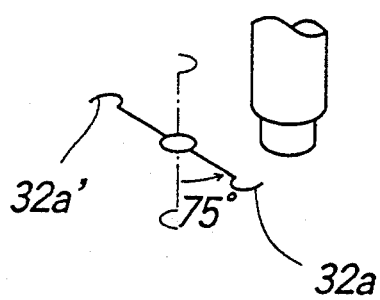
Figure 9E:
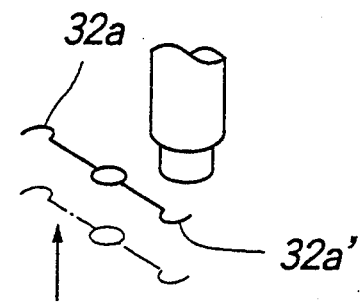
Figure 9C:
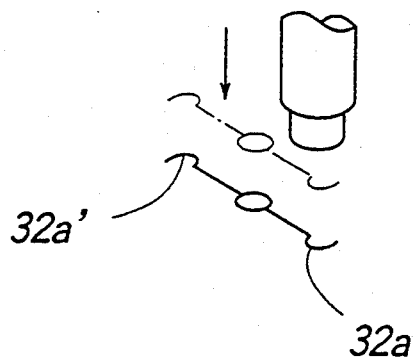

(1) When machining is over and an exchange instruction is fed, the main shaft 23 is positioned by a position sensor, not shown, so that the lock hole 26b of the lock nut 26 and the piston rod 30 of the locking mechanism 27 coincide with each other (step S101);

(2) The piston rod 30 protrudes so as to be engaged with the lock hole 26b, thereby prohibiting the lock nut 26 from rotating (step S102);

(3) With the lock nut 26 locked in the direction of rotation, the main shaft 23 turns approximately 60 degrees, causing the lock nut 26 to loosen, and the notches 25e of the tool holder 25 and the urging pieces 26c of the lock nut 26 coincident with each other (step S103). When this occurs, the steel ball 41 forming the nut positioning means 34 is engaged with a concave portion 31a of a power transmission key 31. Also, the tool holder 25 is held to be urged in close contact with the end face of the main shaft 23 by the tool urging means 33;

(4) Then, the exchange arm 32 positioned in its standby position as shown in FIG. 9(a) turns 75 degrees as shown in FIG. 9(b) about the exchange shaft 45. As a result, the grip 32a at one end of the exchange arm 32 grips the gripping groove 25g of the tool holder 25, while the engagement key 47 of the exchange arm 32 is engaged with the engagement groove 25h of the tool holder 25 (step S104). When this is done, on the side of the tool magazine that transfers a subsequent-process tool holder 25 to its standby position the subsequent-process tool holder 25 is held by a grip 32a' of the other end of the exchange arm 32;

(5) In this state, the exchange arm 32 goes down as shown in FIG. 9(c) (step S105), turns 180 degrees as shown in FIG. 9(d) (step S106), and goes up as shown in FIG. 9(e) (step S107).

Figure 9F:
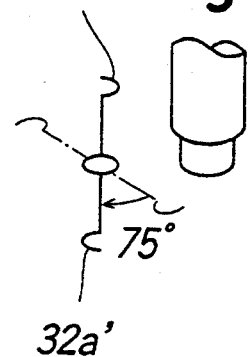

Through these steps, the female taper 25d of the preceding-process tool holder 25 that has been held by the grip 32a' of the other end of the exchange arm 32 is fitted to the male taper 23b of the main shaft 23. Simultaneously, the tool urging means 33 urges and holds the tool holder 25 into its clamped state. At this point, the subsequent-process tool that has been gripped on one side of the exchange arm 32 is held by the tool pot of the tool magazine;

(6) Next, the exchange arm 32 turns 75 degrees in the direction reverse to step S104 as shown in FIG. 9(f), returning to its standby position (step S108);

(7) The main shaft 23 rotates in the direction reverse to that in step S103 where the tool is unclamped, until a specified torque is reached, so that the tool holder 25 is tightened and fixed to the main shaft 23 by the urging pieces 26c of the lock nut 26 (step S109); and (8) Finally, the piston rod 30 plunges in, causing the lock nut 26 to be disengaged with the piston rod 30 and released from locking (step S110), thus completing the operation of tool replacement.

The present embodiment is further provided with a nut loosening detection means 36, by which detected and stored is the amount of clearance between the lock nut 26 and the lower end cover 43 at the time when the tool holder 25 has been completely tightened. The resulting amount of clearance is compared with the amount of clearance that exists during the rotation of the main shaft 23, where if there is a variation therebetween, the lock nut 26 is decided to have loosened, causing a loosening detection signal to be generated, the main shaft 23 being promptly stopped.

Figure 1:
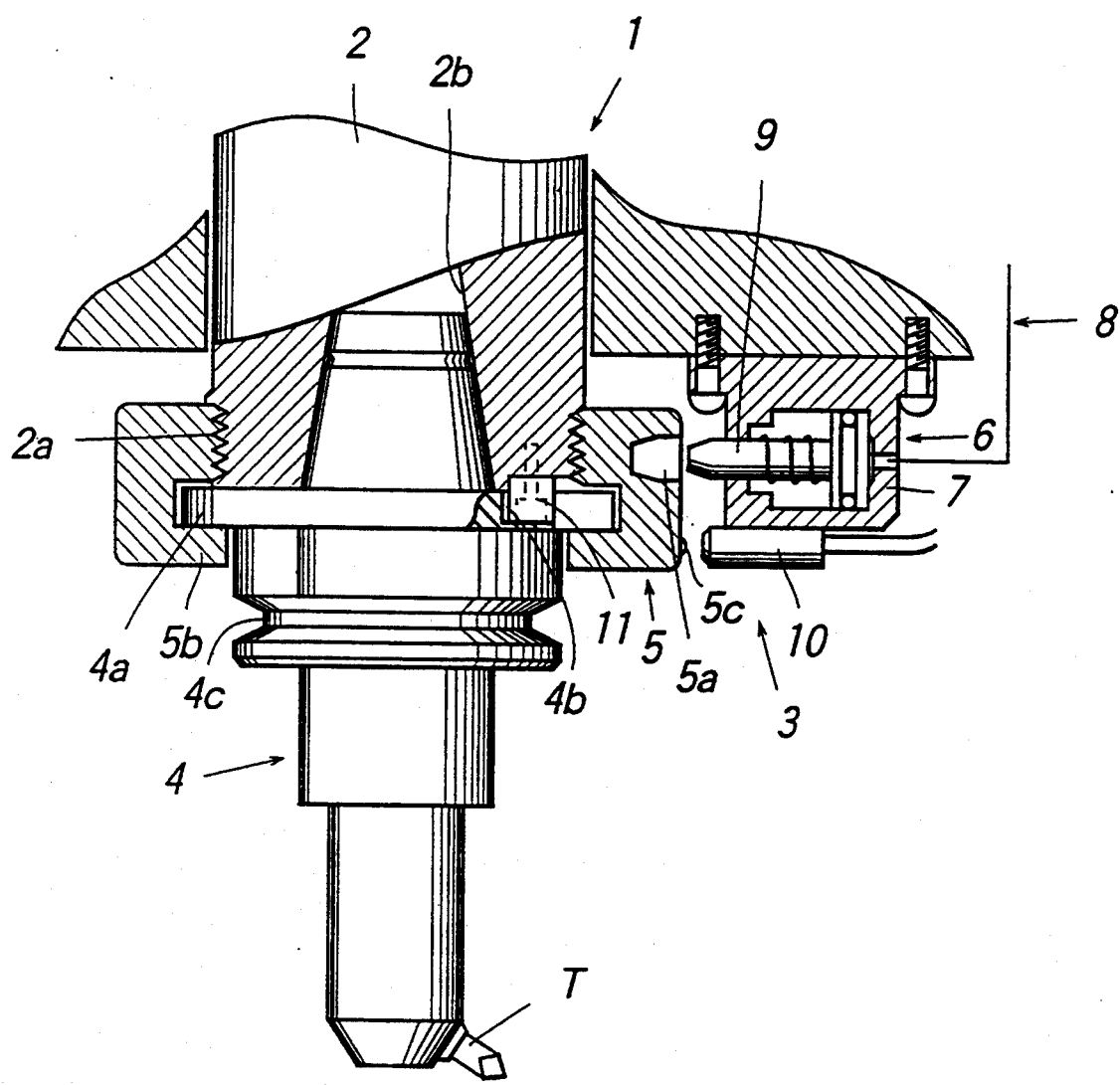
FIG. 1 is a side view partly in section of a prior art tool clamping/unclamping device.
Figure 2:
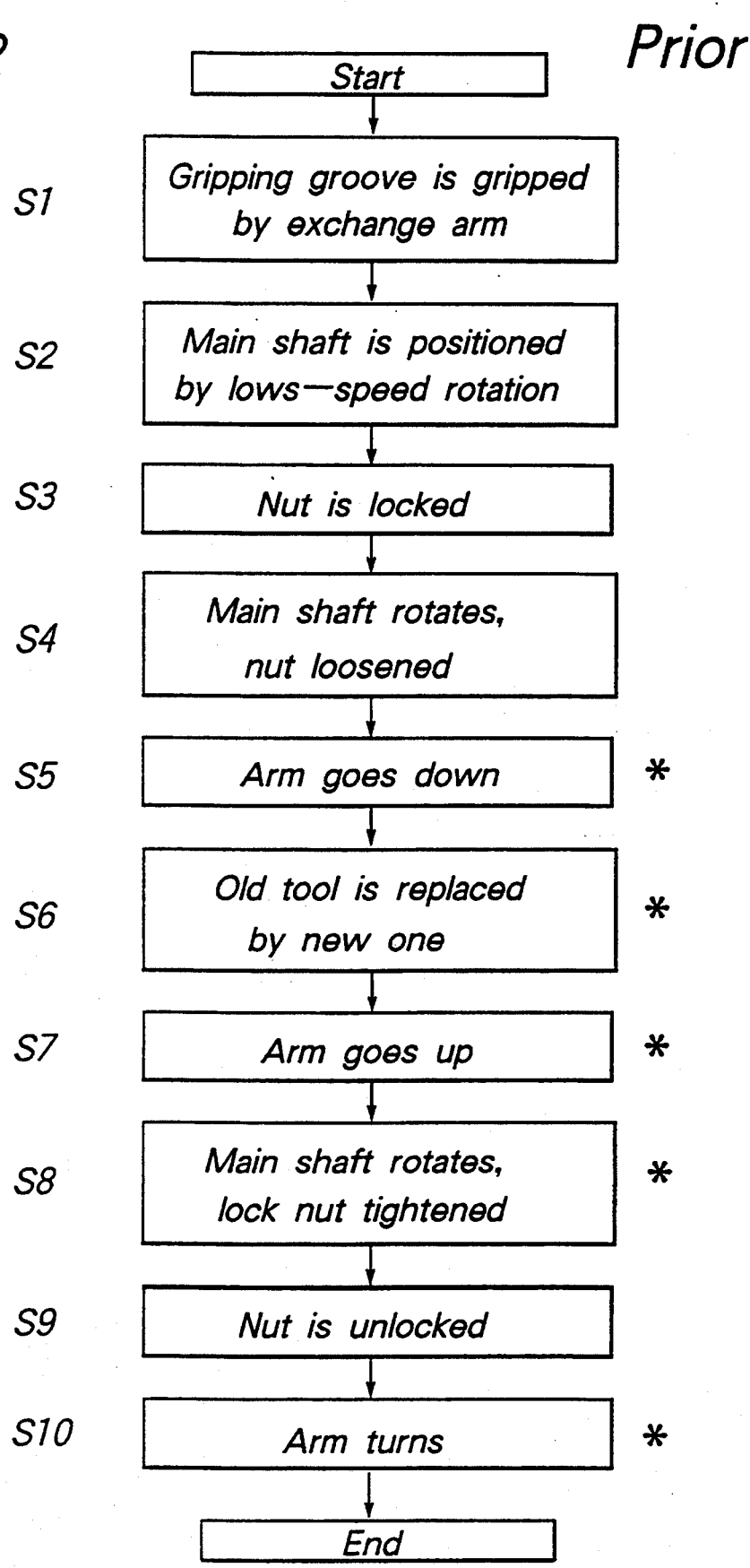
FIG. 2 is a flowchart for explaining the operation of the prior art device.

In the prior art device, it is arranged that the tool holder 25 is held by the exchange arm 32. Therefore, it is necessary to turn the exchange arm 32 to the gripping position and carry out the unclamping operation with the tool being gripped, before the lock nut 26 is loosened. This would result in noncontinuous operation of the exchange arm 32 as indicated by the asterisk (*) in FIG. 2 for the prior art, disadvantageously. In contrast to this, the present embodiment is provided with the tool urging means 33 for urging and holding the tool holder 25 in its clamped state. Therefore, the lock nut 26 may be loosened even when the tool holder 25 is not held by the exchange arm 32, thus eliminating the need of keeping the tool holder 25 held by the exchange arm 32. Consequently, the operation of the exchange arm 32 can be carried out in a continuous manner as indicated by the asterisk in FIG. 8, and yet with high speed.

Further, according to the present embodiment, there is provided a nut positioning means 34 for positioning the lock nut 26 with respect to the main shaft 23 in the direction of rotation. Thus, even if the main shaft 23 is rotated with the tool holder 25 unclamped, the phase relation between the lock nut 26 and the main shaft 23 can be maintained properly.

Further, if the phase relation between the lock nut 26 and the main shaft 23 should be varied, manually rotating the lock nut 26 would allow the steel ball 41 of the nut positioning means 34 to be engaged with the concave portion 31a of the power transmission key 31. Thus, the lock nut 26 and the main shaft 23 can be adjusted in phase simply and correctly without the need of visual checking.

Furthermore, according to the present embodiment, as the rotation angle of the lock nut 26 increases, the bolt 42 makes contact with the power transmission key 31, regulating the rotation of the lock nut 26 under 120 degrees. Thus, even if the main shaft 23 is rotated at high speed with the tool unclamped, the lock nut 26 can be prevented from dropping off due to excessive rotation.

Yet further, according to the present embodiment, there is provided a nut loosening detection means 36 for detecting the position of the lock nut 26 in the direction of axial line with respect to the main shaft 23. Thus, any loosening of the lock nut 26 can be detected.

FIG. 10 shows a second embodiment of the invention, in which a lock nut 51 is provided with a tool urging means 52. A flange 53a of a tool holder 53 has a recess 53b formed thereon, by which arrangement a steel ball 54 of the tool urging means 52 can be urged against the recess 53b by a spring 55, so that the tool holder 53 is urged upward.

Figure 11:
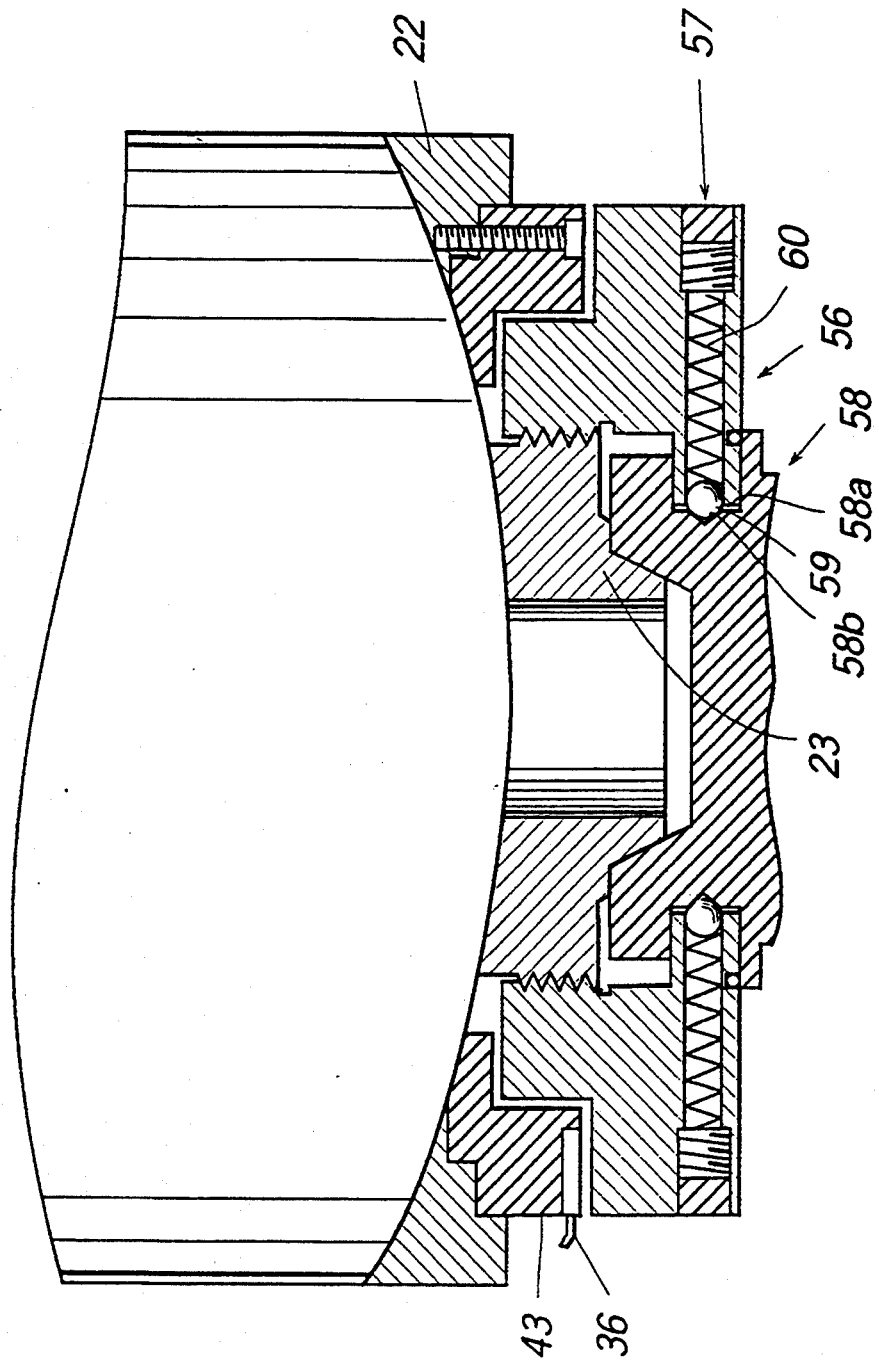
FIG. 11 is an enlarged view of the main part of a tool urging means of a third embodiment of the invention.
Figure 12:
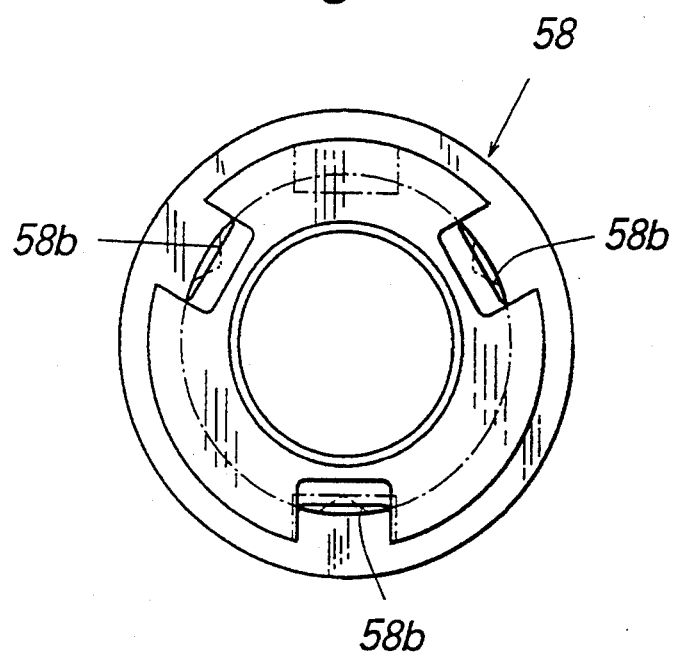
FIG. 12 is a plan view of a tool holder.
Figure 13:
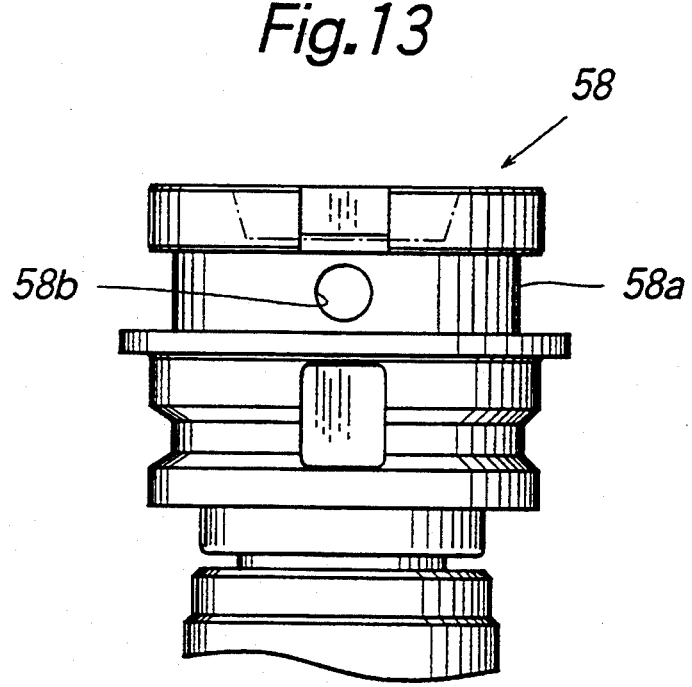
FIG. 13 is a side view of the tool holder.

FIGS. 11 to 13 show a third embodiment of the invention. In this embodiment, a lock nut 56 is so arranged that a tool urging means 57 acts on an urging groove 58a of a tool holder 58. A steel ball 59 of the tool urging means 57 is urged against a recess 58b provided to the urging groove 58a of the tool holder 58 by means of a spring 60, so that the tool holder 58 is urged upward.

Figure 14:
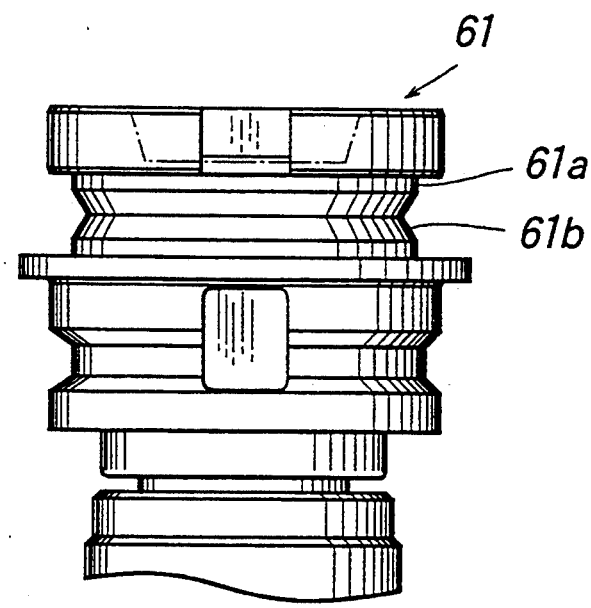
FIG. 14 is a side view of the tool holder of a fourth embodiment of the invention.

FIG. 14 shows a fourth embodiment of the invention. In this embodiment, an engagement groove 61b is provided along the whole circumference of an urging groove 61a of a tool holder 61, in place of the recesses 53b and 58b that are partly provided within the urging groove in each of the above-described embodiments.

According to the tool urging means 52, 57 in above-described embodiments, the steel ball 54, 59 is urged against the recess 53b, 58b or the engagement groove 61b provided to the flange 53a or the urging groove 58a, 61a. Thus, the same effect as in the first embodiment can be obtained and abrasion of the urging face of the flange can be avoided.

Figure 15:
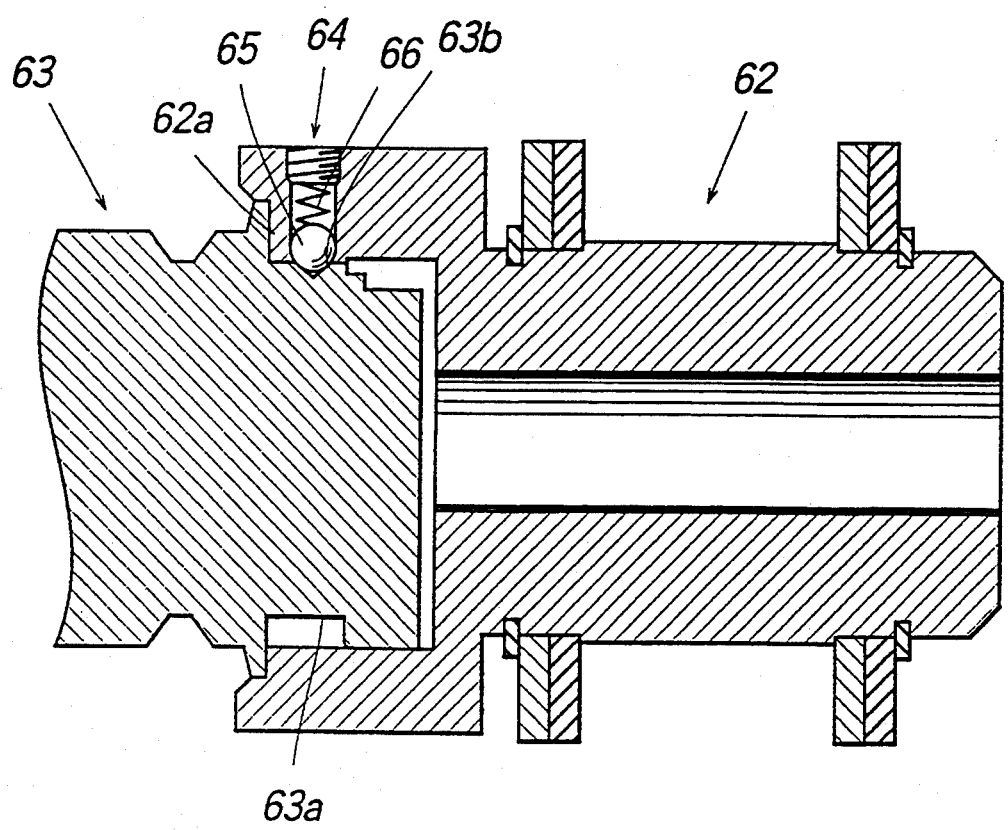
FIG. 15 is a sectional view of a fifth embodiment of the invention.

FIG. 15 shows a fifth embodiment of the invention. In this embodiment, the aforementioned recess 53b, 58b or the engagement groove 61b can be used for holding a tool holder 63 to a tool pot 62 of a tool magazine. In this case, a protrusion 62a is provided at an inner edge portion of the opening of the tool pot 62 so as to correspond to a notch of the tool holder 63, in which arrangement a steel ball 65 is urged by the tool urging means 64 of the tool pot 62 provided to the protrusion 62a by means of a spring 66 so as to be engaged with a recess 63b of an urging groove 63a.

Figure 16:
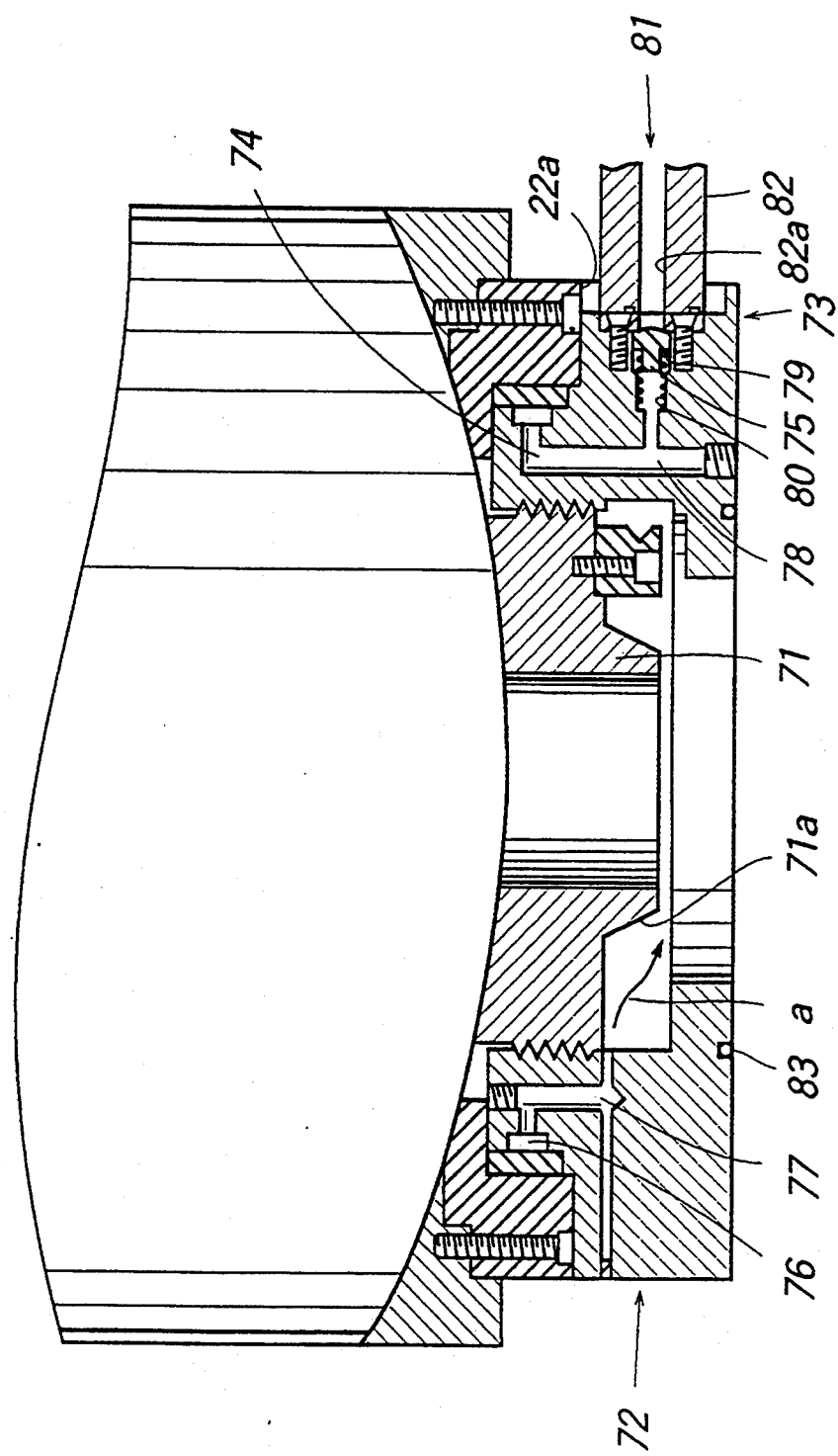
FIG. 16 is an enlarged view of the main part of a sixth embodiment of the invention.

FIG. 16 shows a sixth embodiment of the invention. In this embodiment, a fluid spraying mechanism 73 is provided for spraying fluid, such as air, into a lock nut 72 screwed at the lower end of a main shaft 71. The fluid spraying mechanism 73 comprises a fluid passage 74 formed within the lock nut 72 and a valve 75 for opening and closing the fluid passage 74. The fluid passage 74 has an annular groove 76 formed on the outer circumference of the lock nut 72. The annular groove 76 has a nozzle 77 for injecting fluid to a male taper 71a at an end of the main shaft. The annular groove 76 is connected to an external fluid source by means of a connecting passage 78. The valve 75 is disposed within an external connection port 79 of the connecting passage 78, and urged outward of the lock nut 72, i.e. in such a direction as to close the external connection port 79, by a spring 80.

The connection port 79 opens to a lock hole 72a, into which a piston rod 82 of a locking mechanism 81 is to be inserted. The piston rod 82 is provided with a fluid passage 82a. When fluid is fed through the fluid passage 82a, the valve 75 opens so that the fluid is sprayed through the annular groove 76 and the nozzle 77 in the direction of arrow a in the figure. In addition, an O-ring 83 is provided on the bottom face of the lock nut 72 rather close to its center, so that when the lock nut 72 holds a tool holder, which is not shown, chips and the like can be prohibited from invading into the urging groove of the tool holder.

According to the present embodiment, since the fluid spraying mechanism 73 is provided, the fluid can be sprayed in the direction of arrow a, thus prohibiting chips and others from adhering to the tool clamping face of the main shaft 71. Also, since the valve 75 is provided, chips can be prevented from invading into the fluid passage 74. Yet, the opening and closing operation of the valve 75 can be interlocked with the locking operation by the locking mechanism 81, thus allowing fluid to be fed during replacement of the tool.

Figure 17:
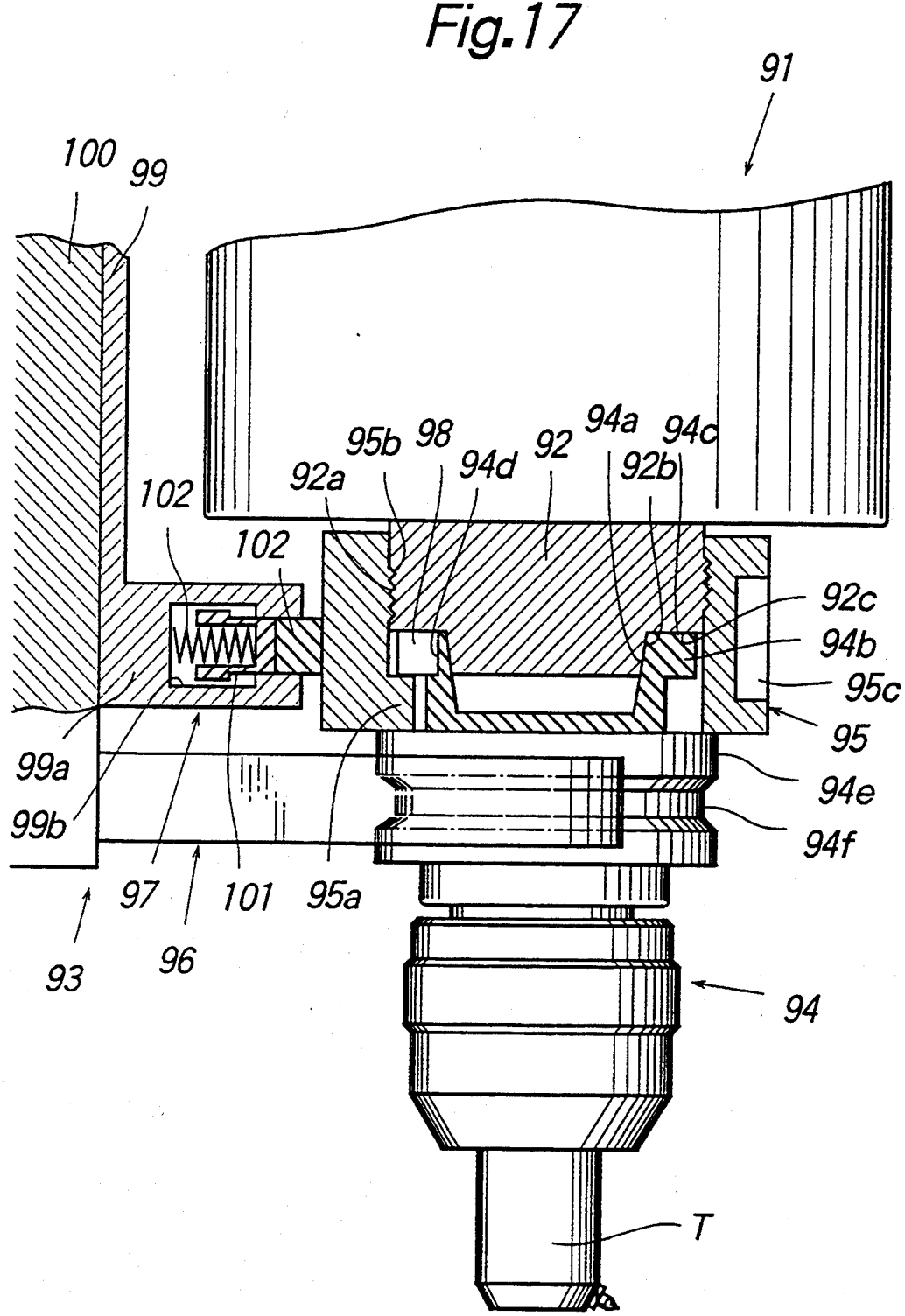
FIG. 17 is a side view partly in section of a seventh embodiment of the invention.

FIG. 17 shows a seventh embodiment of the invention. In this embodiment, a tool holder 94 is clamped by a tool clamping/unclamping device 93 to a main shaft 92 rotatably supported by a main shaft unit 91. The tool clamping/unclamping device 93 comprises a lock nut 95 screwed at the lower end of the main shaft 92, and a locking mechanism 97 disposed to an exchange arm 96.

Figure 18:
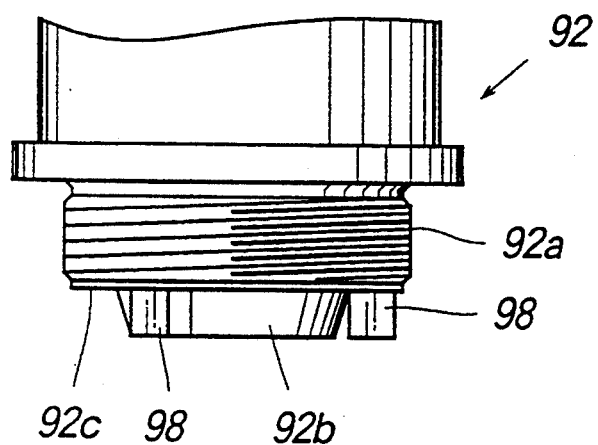
FIG. 18 is a side view of a main shaft.
Figure 19:
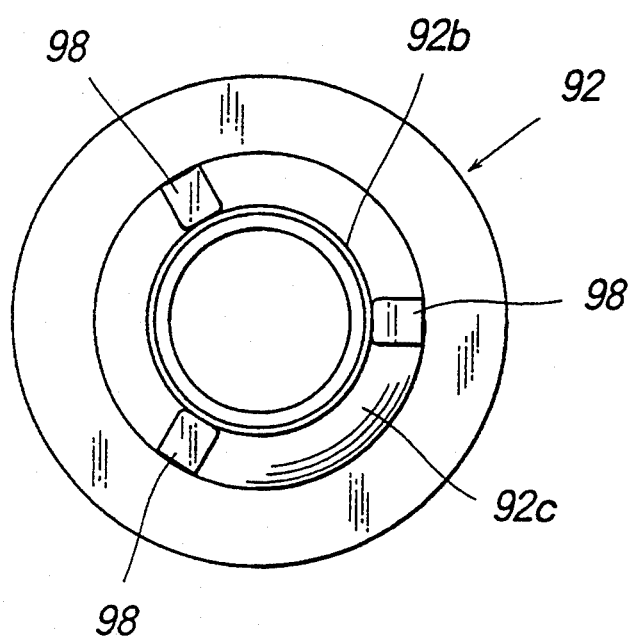
FIG. 19 is a bottom view of the main shaft.

At the lower end of the main shaft 92, as shown in FIGS. 18 and 19, there are formed a male screw 92a to be screwed with the lock nut 95, a male taper 92b to which the tool holder 94 is to be fitted, and a contact end face 92c with which the tool holder 94 is pressed into contact. The contact end face 92c has a power transmission key 98 bolted and fixed thereto.

Figure 20:
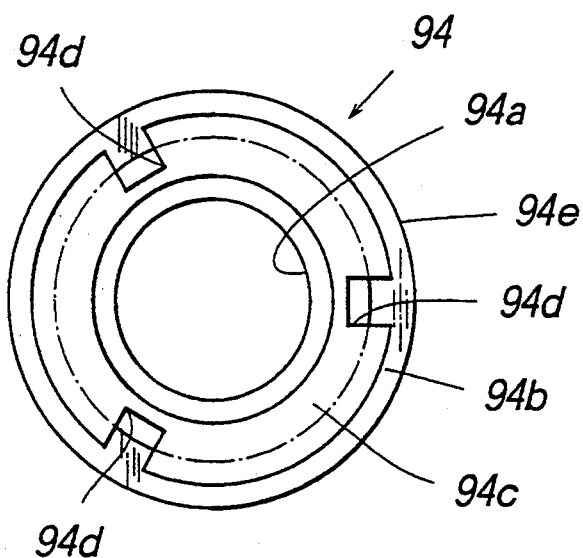
FIG. 20 is a plan view of a tool holder.
Figure 21:
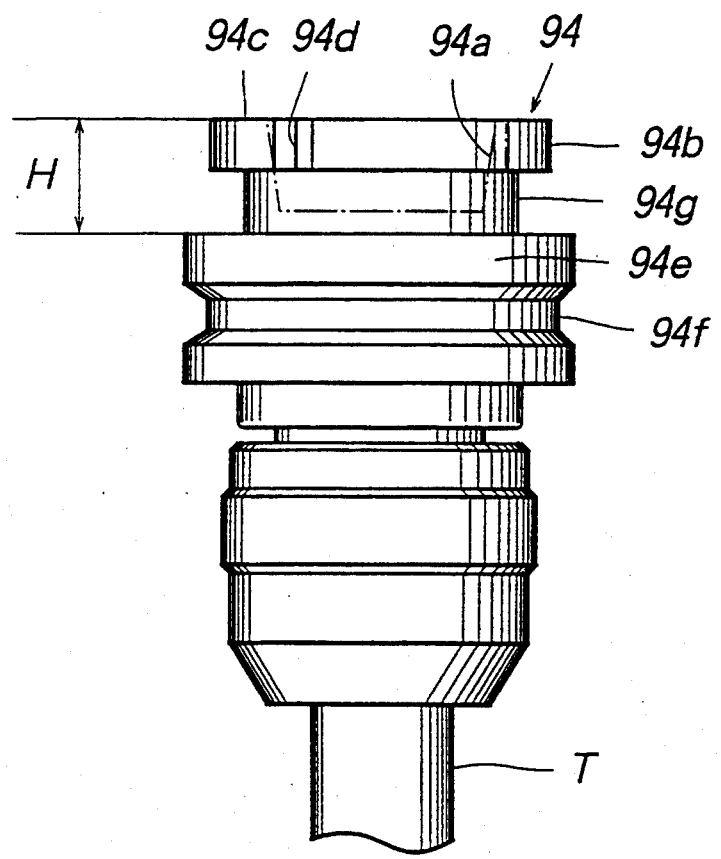
FIG. 21 is a side view of the tool holder.

The tool holder 94, as shown in FIGS. 20 and 21, has a taper hole 94a formed thereon to be engaged with the male taper 92b of the main shaft 92. In the flange 94b on the periphery of the taper hole 94a there are formed a contact end face 94c to be in close contact with the contact end face 92c of the main shaft 92, and a keyway 94d to be engaged with the power transmission key 98 to transmit rotating force. Also, a flange 94e formed below the flange 94b has a gripping groove 94f formed thereon to be gripped by the exchange arm 96. In addition, as described later, the space between the flange 94b and the flange 94e is made to be an urging groove 94g into which urging pieces 95a of the lock nut 95 are to be fitted.

Figure 22:
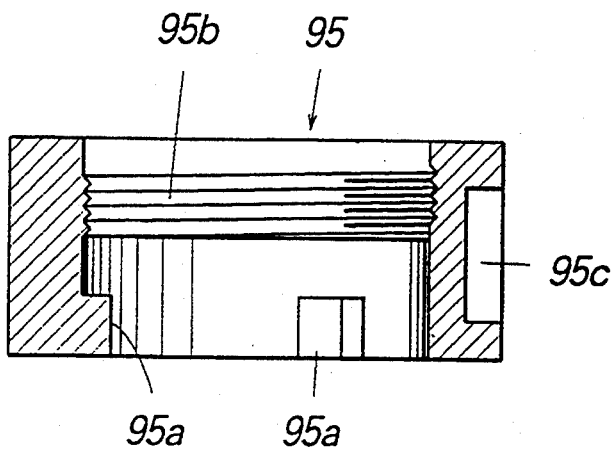
FIG. 22 is a sectional view of a lock nut.
Figure 23:
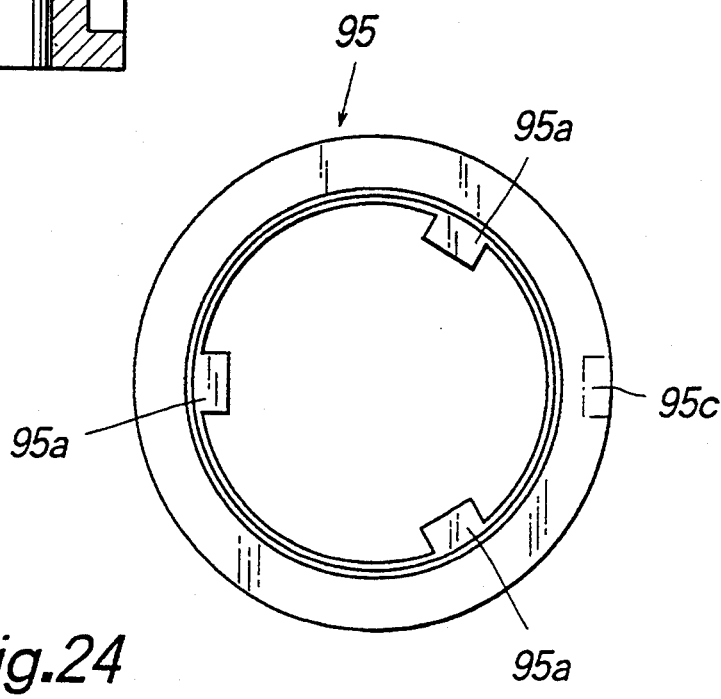
FIG. 23 is a bottom view of the lock nut.

At the internal upper end of the lock nut 95, as shown in FIGS. 22 and 23, there are formed urging pieces 95a for urging the lower face of the flange 94b of the tool holder 94, and a female screw 95b to be screwed with the male screw 92a of the main shaft 92. Also, on the outer circumferential face of the lock nut 95 there is formed a lock hole 95c for locking the lock nut 95.

Figure 24:
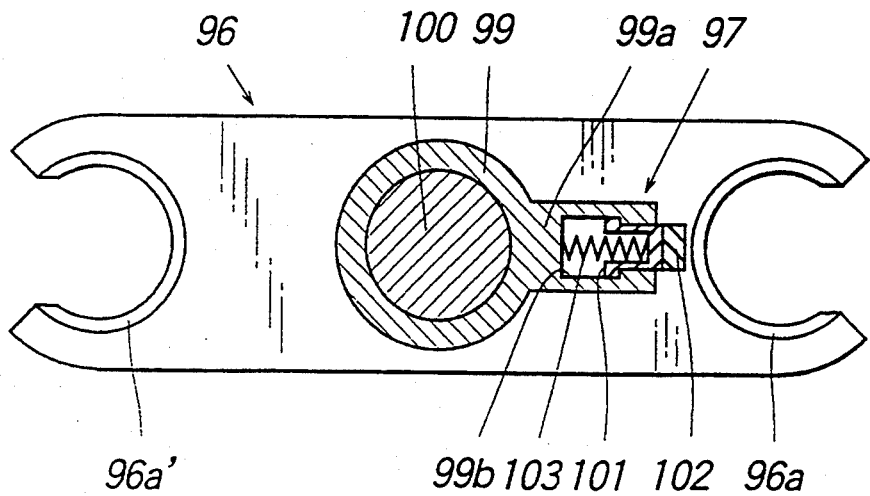
FIG. 24 is a plan view partly in section of the exchange arm.

The exchange arm 96, as shown in FIGS. 17 and 24, is fixed at the lower end of an exchange shaft 100 rotatably and axially movably supported to a housing 99, which is the device anchor, so that the exchange arm 96 is movable leftward and rightward along with the housing 99. By this arrangement, as shown in FIG. 21, the tool holder 94 can be replaced simply with another one by moving the tool holder 94 by a distance H in the axial direction of the main shaft.

The locking mechanism 97 is mounted to the housing 99. A slide hole 99b is formed at a convex portion 99a of the housing 99. A slider 101 is slidably disposed within the slide hole 99b. A lock pin 102 is fixed at the front end of the slider 101. At the rear end of the slider 100 there is disposed a spring 103, by which the lock pin 102 can be urged with a specified urging force against the outer circumferential face of the lock nut 95.

Figure 25A:
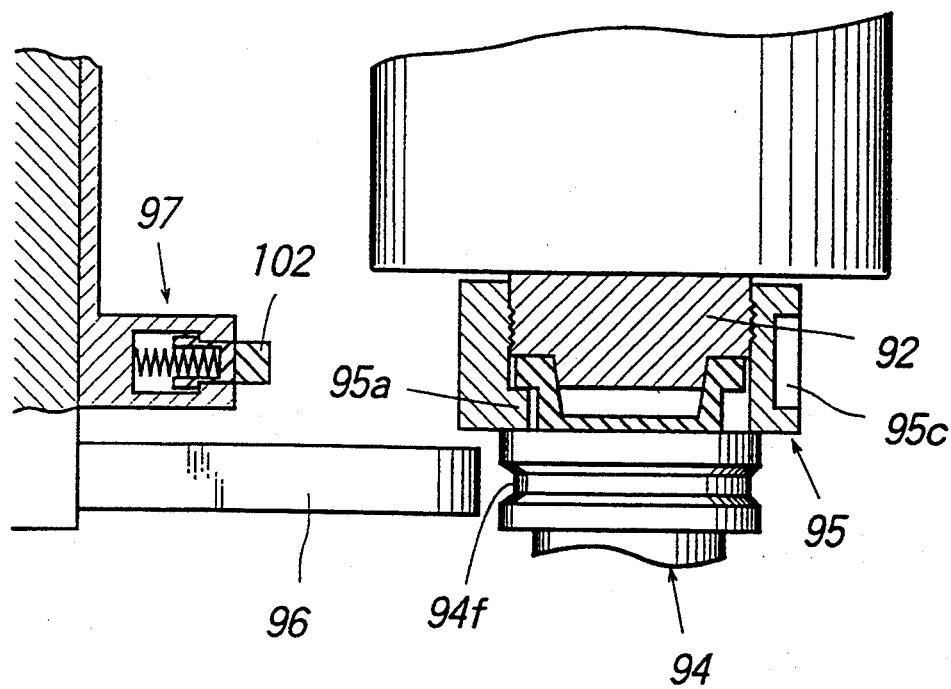
FIGS. 25(a) and 25(b) are explanatory views of the operation.
Figure 25B:
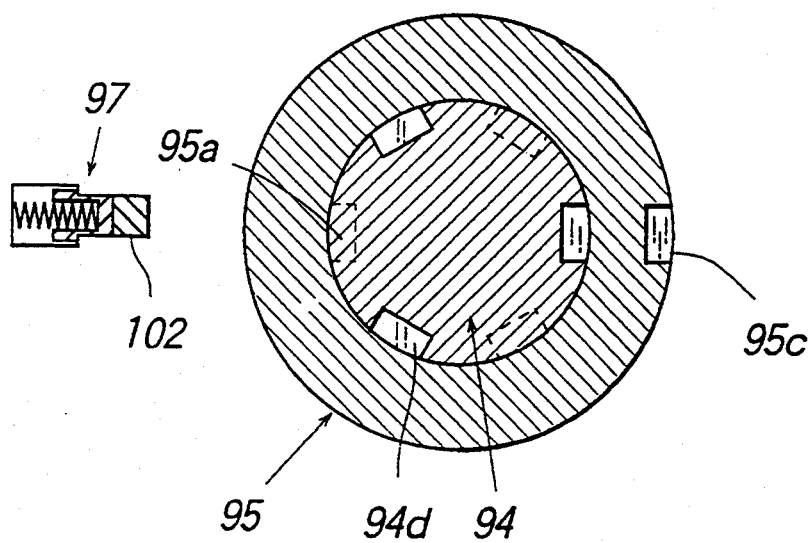

The function of the present embodiment is now described with reference to FIGS. 25 through 29. First described is a case where the tool holder 94 clamped to the main shaft 92 is removed. With no instruction for tool replacement, as shown in FIG. 25(a), the locking mechanism 97 and the exchange arm 96 are positioned away from the lock nut 95. Besides, as shown in FIG. 25(b), the urging pieces 95a of the lock nut 95 and the keyways 94d of the tool holder 94 are positioned so as not to coincide with each other.

Figure 26A:
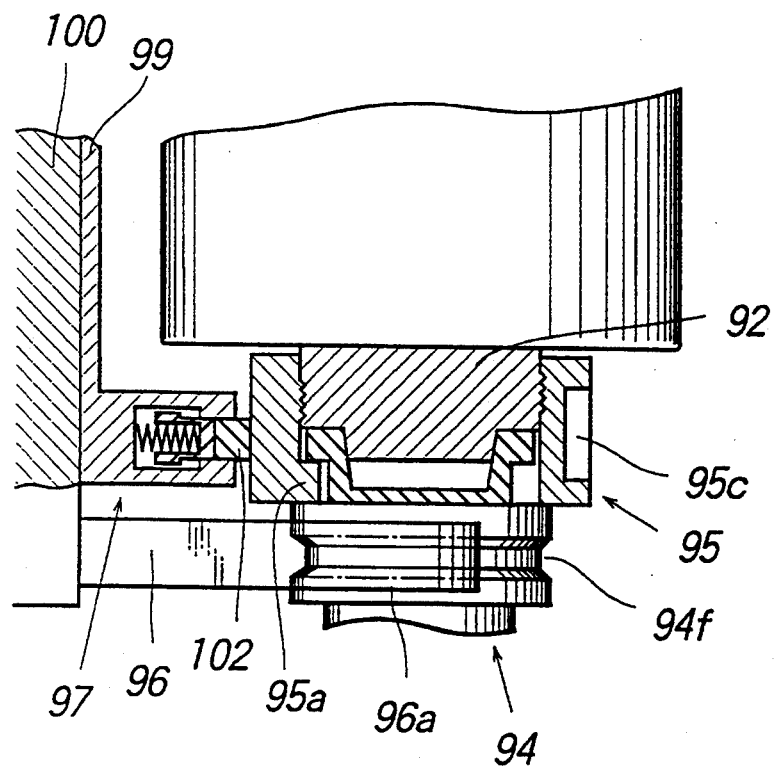
FIGS. 26(a) and 26(b) are explanatory views of the operation.
Figure 26B:
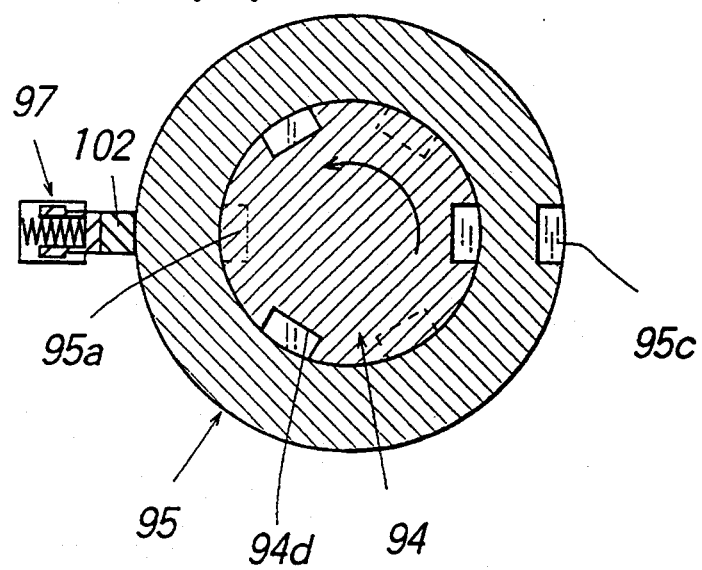
Figure 27A:
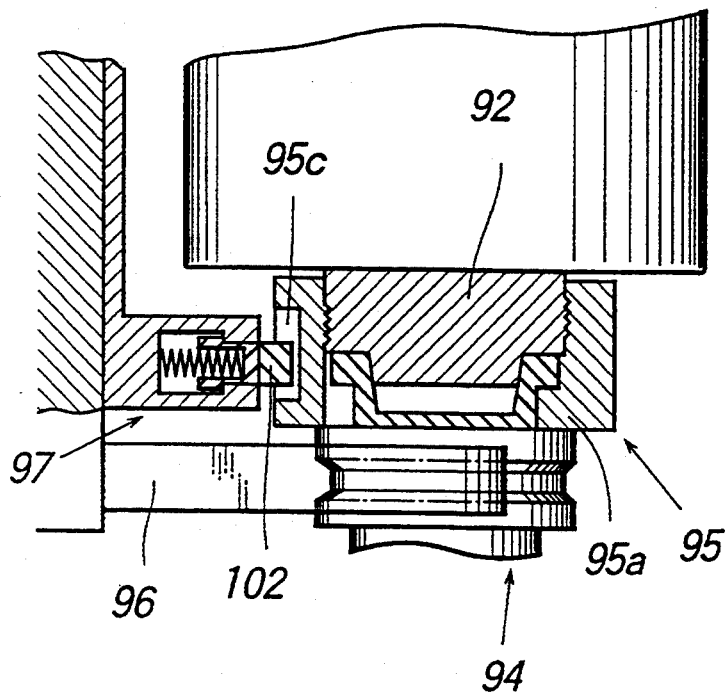
FIGS. 27(a) and 27(b) are explanatory views of the operation.

In this state, when an instruction for tool replacement is issued, the locking mechanism 97 and the exchange arm 96 move rightward as shown in FIG. 26(a), so that the lock pin 102 is put into pressure contact with the outer circumferential face of the lock nut 95 and at the same time the gripping groove 94f is gripped by the grip 96a of the exchange arm 96. Thereafter, the main shaft 92 is rotated in the direction of arrow in FIG. 26(b), whereby the lock nut 95 rotates in the same direction with the lock pin 102 in pressure contact with the lock nut 95. Then, as shown in FIG. 27(a), the lock pin 102 is engaged with the lock hole 95c of the lock nut 95, making the lock nut 95 fixed in the direction of rotation.

Figure 27B:
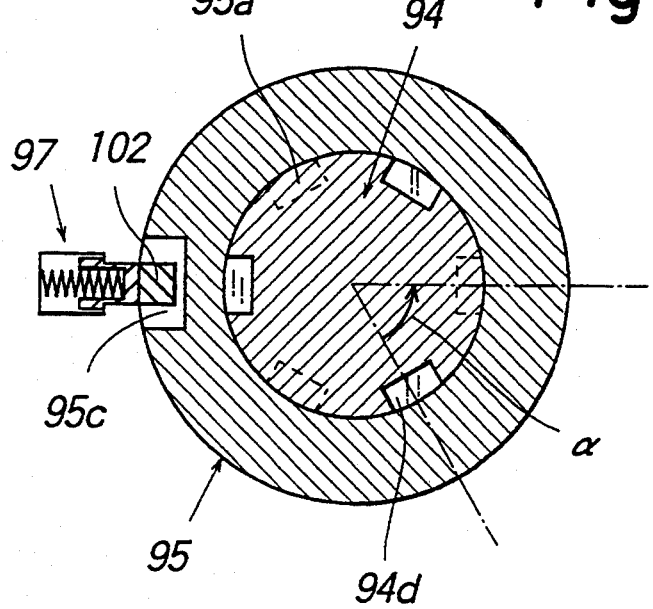
Figure 28A:
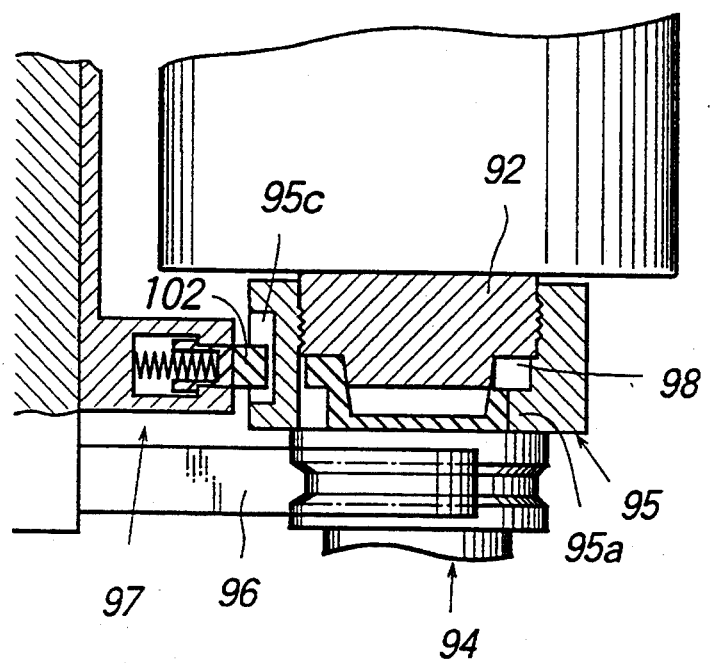
FIGS. 28(a) and 28(b) are explanatory views of the operation.
Figure 28B:
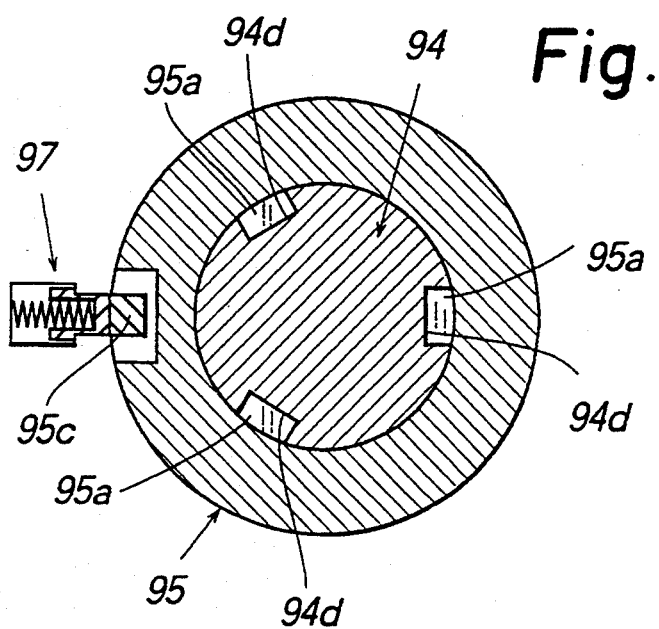
Figure 29A:
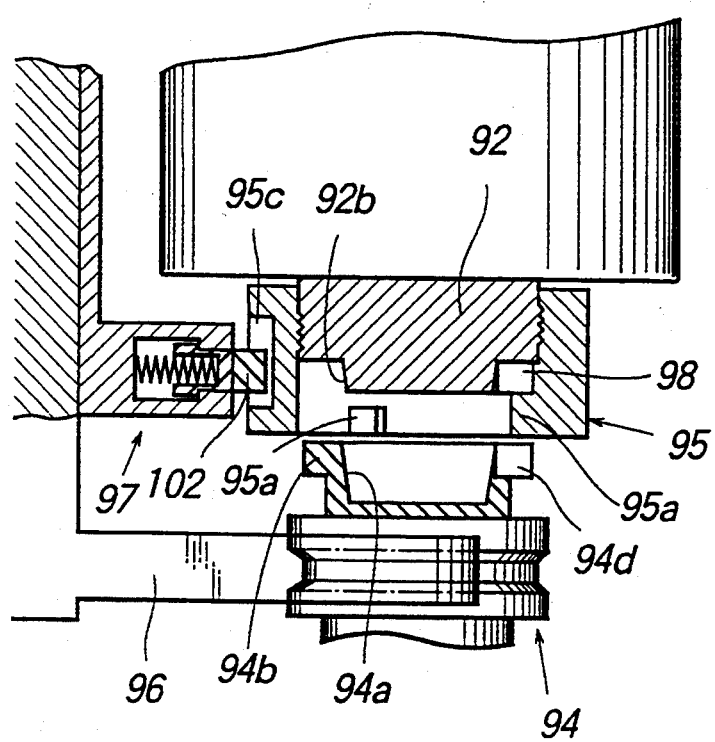
FIGS. 29(a) and 29(b) are explanatory views of the operation.
Figure 29B:
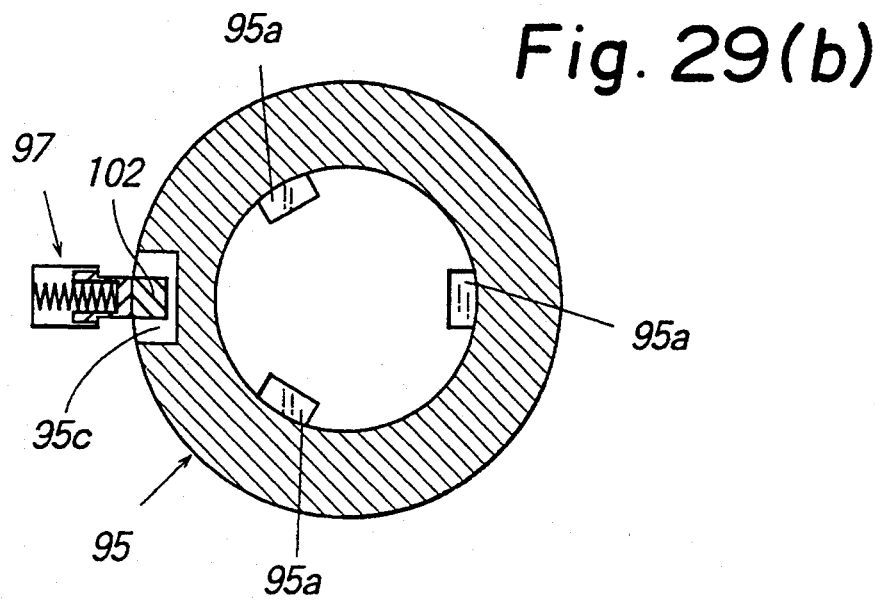

Further, as shown in FIG. 27(b), when the main shaft 92 is rotated by a specified angle a in the direction of arrow with the lock nut 95 fixed, the urging pieces 95a of the lock nut 95 and the keyways 94d of the tool holder 94 coincide with each other, as shown in FIGS. 28a and 28b. In this state, when the exchange arm 96 is moved downward as shown in FIGS. 29a and 29b, the tool holder 94 lowers with its keyways 94d passing by the inside of the urging pieces 95a, thus being removed from the main shaft 92.

Next, when the exchange arm 96 is turned 180 degrees, the other tool holder 94 gripped by the opposite-side grip 96a' of the exchange arm 96 comes to coincide with the axis line of the main shaft 92. When the exchange arm 96 is elevated in this state, the tool holder 94 goes up with its keyways 94d passing by the inside of the urging pieces 95a, so that the taper hole 94a fits into the male taper 92b of the main shaft 92. At this point, the lock nut 95 is locked by the lock pin 102. With this state unchanged, when the main shaft 92 is rotated in the reverse direction of the above case until its driving torque reaches a specified value, the replacement of tool is completed.

As described above, according to the present embodiment it has been arranged that the lock nut 95 is rotated by the main shaft 92 with the lock pin 101 pressed into contact with the outer circumferential face of the lock nut 95, whereby the lock pin 102 is naturally engaged with the lock hole 95c of the lock nut 95. As a result, the position sensor is no longer needed, and besides there will be no possibility of any fault or malfunction, which would be encountered in the case of using a position sensor or the like to do positioning. This leads to improved reliability of the device.

It has also been arranged that, as the locking mechanism 97, the lock pin 102 is pressed into contact with the lock nut 95 by using elastic force of the spring 103 or the like. Therefore, compared with the case of a mechanism incorporating a hydraulic cylinder or the like, the resulting device is simplified in construction, suppressed in cost, and reduced in work of maintenance and inspection and others.

Further, it has been arranged that after the lock nut 95 is fixed with the lock pin 102, the main shaft 92 is rotated by an arbitrary angle until it attains a specified torque. Thus, even if there is some error in the thickness of the flange 94b of the tool holder 94 to be clamped by the lock nut 95 or if there occurs some abrasion at the screw portions of the lock nut 95 and the main shaft 92, it is possible to tighten the tool holder 94 at a constant tightening torque.

Furthermore, the distance H as shown in FIG. 21 may be shortened to a substantial extent by virtue of elimination of the shank that would be involved in the prior art. Accordingly, the time required for tool replacement can be shortened.

Although the above description of the seventh embodiment has been focused on the case in which the tool clamping/unclamping device 93 is provided directly to the lower end of the main shaft 92 disposed in the vertical direction, the tool clamping/unclamping device 93 is, of course, also applicable to various machine tools other than the above case.

Figure 30:
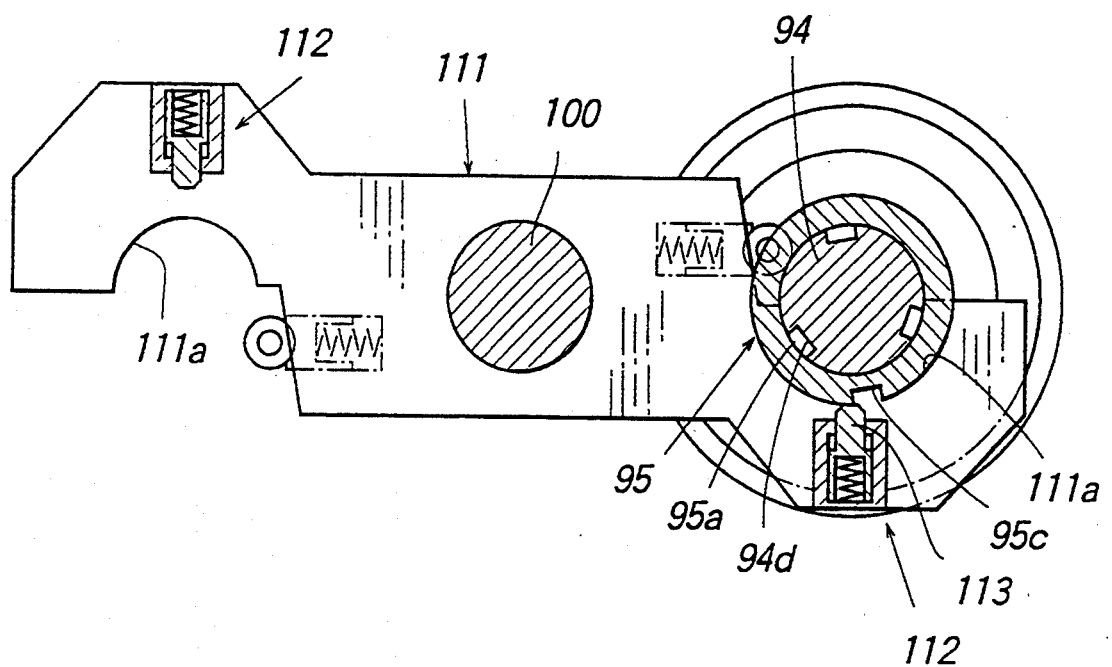
FIG. 30 is a plan view partly in section of an eighth embodiment of the invention.

FIG. 30 shows an eighth embodiment of the invention. In this embodiment it is arranged that a lock pin 113 of a locking mechanism 112 is pressed into contact with the lock nut 95 by turning operation of an exchange arm 111. In this pressure-contact state, the exchange shaft 100 is rotated, whereby the lock hole 95c and the lock pin 113 are engaged with each other. As a result, the lock nut 95 is fixed, allowing the tool holder 94 to be clamped or unclamped. The present embodiment can be applied not only machine tools of the above-described type such as in the seventh embodiment, in which the exchange arm 96 moves in the direction perpendicular to the axis, but also to those in which the exchange arm 96 performs only turning operation and up-down movement.

Figure 31:
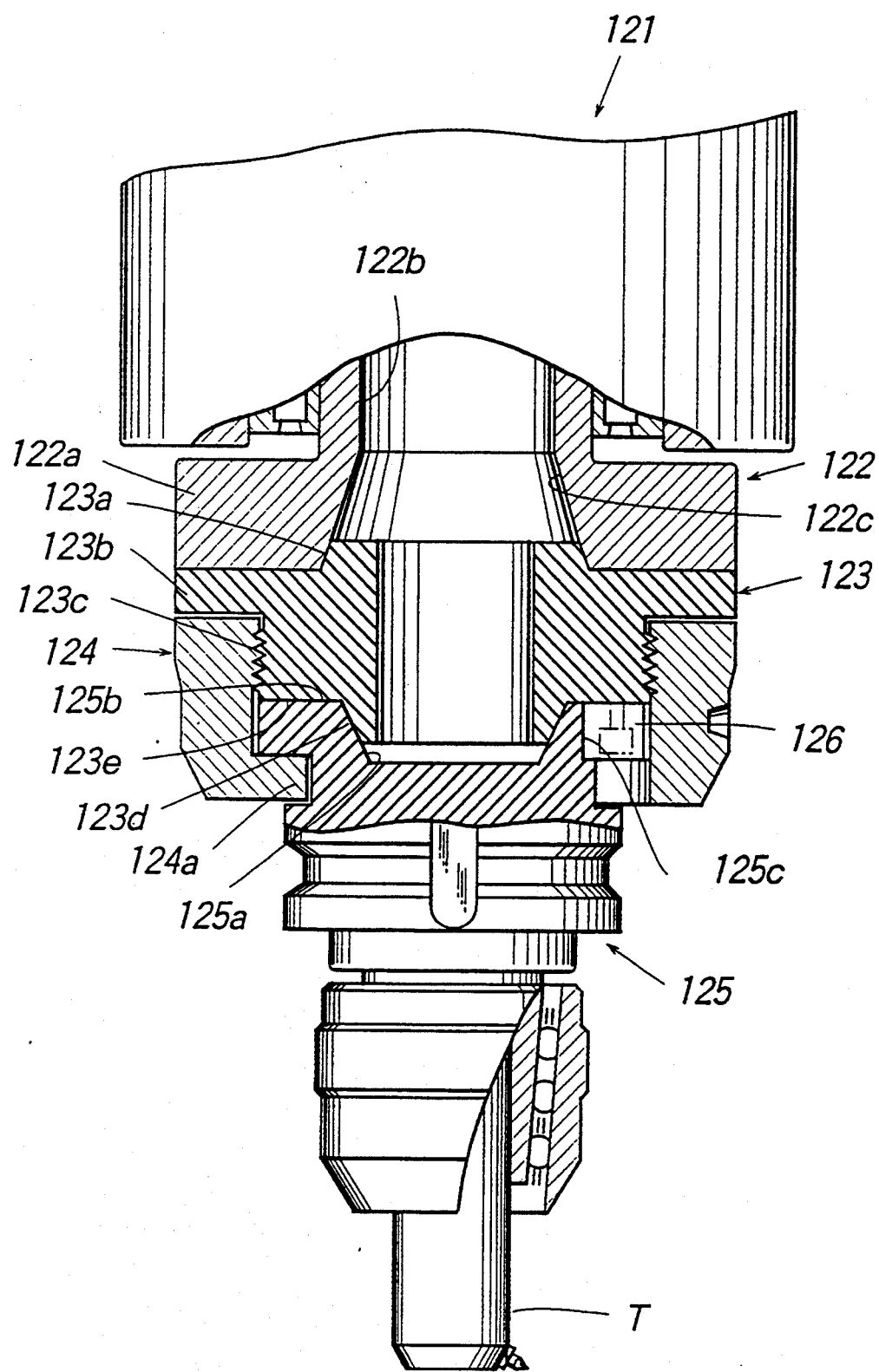
FIG. 31 is a side view partly in section of a ninth embodiment of the invention.
Figure 32:
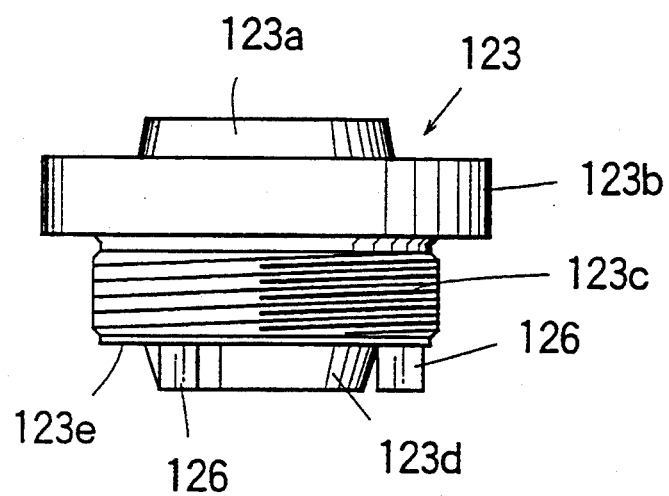
FIG. 32 is a side view of a relay member.
Figure 33:
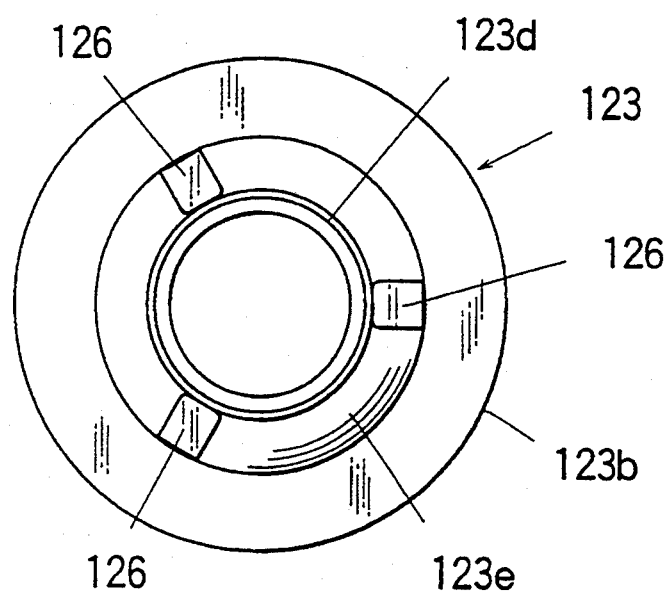
FIG. 33 is a bottom view of the relay member.

FIG. 31 is a side view showing in section part of a ninth embodiment of the invention. A relay member 123 is attached to a main shaft 122 of a main shaft unit 121. Via this relay member 123, a tool holder 125 is mounted by a lock nut 124. A flange 122a is provided at the lower end of the main shaft 122, and a taper hole 122c is provided at the entrance of a cylindrical hole 122b in the direction of the axis core. As shown in FIGS. 32 and 33, the relay member 123 fixed at the lower end of the main shaft 122 is provided with a male taper 123a to be engaged with the taper hole 122c of the main shaft 122, and a flange 123b to be put into close contact with an end face of the flange 122a. The relay member 123 is further provided with a male screw 123c to be screwed with the lock nut 124 in succession to the flange 123b, and a male taper 123d to be engaged with a female taper 125a of the tool holder 125. The base portion of the male taper 123d of the relay member 123 is made to be a contact end face 123e to be put into contact with a contact end face 125b of the tool holder 125, on which contact end face 123e three power transmission keys 126 are provided at equal angles with respect to the axis core.

Normally, the relay member 123 is fixed at an end of the main shaft 122 with screws or the like, which are not shown, while the lock nut 124 is screwed to the relay member 123. In addition, the way of tool replacement in this embodiment is almost the same as in the foregoing embodiment.

Furthermore, the structure of the end side of the tool holder 125, i.e. on the side at which a tool T is fitted, exemplified in the present embodiment is of the roll-lock-chuck type that is suited for gripping the end mill or the like. However, other types also are of course applicable depending on the type of the tool holder 125.

In the case of the present embodiment, for the arrangement that the main shaft 122 is allowed to rotate by arbitrary angles until the contact end face 125b of the tool holder 125 is urged toward the main shaft 122 at a specified torque, the following detection means and control means need to be provided:

(a) To detect any phase difference between the lock nut 124 and the main shaft 122, a position sensor is provided to each of the main shaft 122 and the lock nut 124;

(b) To perform positioning of the lock nut 124 by this position sensor, a control means is to be provided which serves to check the position of the main shaft 122 simultaneously and moreover to calculate the phase difference angle, i.e. positional error, between the lock nut 124 and the main shaft 122;

(c) For tightening the tool, means for detecting tightening torque, tightening position, and tightening speed is required, and an input means that can change these numerical values and a control means that allows checking that the tool has been tightened at a specified clamping force are provided; and (d) A control means is provided which allows the main shaft 122 to rotate by an angle calculated in the foregoing step (b) in clamping the tool, so that the power transmission keys 126 and the urging pieces 124a are positioned into a position that allows the tool to be clamped or unclamped.

During the operation of attaching the tool holder 125, the tool holder 125 is interlocked with the power transmission keys 126 in the direction of rotation by being engaged with the keyways 125c. However, since there is a clearance between a power transmission key 126 and a keyway 125c, the tool holder 125 is urged against one side of the end face of the key over the range of the clearance by a succeeding rotating operation of the main shaft. In this state, the main shaft 122 rotates by a certain angle until a specified torque is reached, so that the end face of the key is tightened as it is urged.

This means that the tool holder 125 and the main shaft 122 can normally be maintained in position in their phase, which can be made use of for setting the reference position in the direction of rotation of the main shaft for the edge position of the tool holder 125. In this connection, the tool clamping/unclamping device disclosed in Japanese Patent Publication No. 4324/3, mentioned before and cited as a prior art, is so arranged that the main shaft normally rotates by a constant angle. As a result, there would be a possibility that the key may be drifted in position within the keyway depending on the variation in the tightening state. This in turn would result in an unstable setting of the origin for positioning of the edge position.

According to the tool clamping/unclamping device of the present invention, since a tool urging means for urging and holding a tool in its clamped state is provided, the tool can be maintained removable without being held by the exchange arm. Accordingly, to advantageous effects, the time required for tool replacement can be shortened and besides the construction of the arm can be simplified.

According to the tool clamping/unclamping device of the invention, since a nut positioning means for performing the positioning or phase adjustment of the lock nut in rotation angle position with respect to the main shaft is provided, the lock nut and the main shaft can be maintained in a specified phase relation therebetween even when the main shaft is rotated at high speed with the tool unclamped, advantageously. Moreover, in event of any drift in phase, the phase relation can be manually adjusted simply and correctly.

According to the tool clamping/unclamping device of the invention, since a nut drop-off preventing means for regulating the amount of rotation angle of the exchange nut with respect to the main shaft is provided, the lock nut can be prevented from dropping off, advantageously.

According to the tool clamping/unclamping device of the invention, since a nut loosening detection means for detecting the position of the lock nut in the direction of axis line of the main shaft is provided, the state of how the tool is held can be checked by the lock nut even during rotation of the main shaft, advantageously.

According to the tool clamping/unclamping device of the invention, since a fluid passage is provided within the lock nut, chips and the like adhering to the face of the main shaft on which the tool is clamped can be sprayed away, thus improving the durability of the clamping face.

According to the tool clamping/unclamping device of the invention, since it is arranged that a lock pin is pressed into contact with the lock nut and the lock nut is rotated so that the lock pin is engaged with a lock concave portion, a position sensor is no longer required, the problem of malfunction due to chips and the like can be solved, and moreover the construction of the locking mechanism can be simplified. Also there is no need of providing electrical wiring for the sensor, thus allowing the device to be adopted for machine tools of such a type that the main shaft is replaced in the whole unit including its attachments. This leads to increased models of applicable machine tools.

According to the tool clamping/unclamping device of the invention, since the tool clamping force can be maintained constantly, the machining precision can be enhanced. Besides, since the tool holder is interlocked with an inverse taper in face-to-face contact at the end portion of the main shaft, the rigidity of the tool is remarkably increased, with safety and reliability also enhanced. Yet, since the moving distance for tool replacement can be reduced, it becomes possible to carry out the work of tool replacement with simplicity and high speed. Furthermore, since the main shaft and the tool holder can be normally maintained in position in their phase, the setting of the reference position in the direction of rotation of the main shaft for edge position can be performed with accuracy. Yet further, use of relay members allows a wide variety of applications for general-use machine tools, and other advantageous applications, for example, in which a U-axis driving equipment is contained within the main shaft. Still furthermore, without the need of machining any precision screws to the main shaft, it is possible to change the device into the nut runner type only by tap processing with the general-use main shaft. Also, since it is arranged that, with the lock nut fixed, the main shaft is rotated by arbitrary angles until a specified torque is reached, an enough tightening torque can be attained even when there is an error in the thickness of the flange at which the tool holding member is clamped by the lock nut or when any screw of the lock nut and the main shaft has worn.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A tool clamping/unclamping device having a nut screwed at an end portion of a main shaft of a machine tool, a tool holding member to be clamped to the end portion of the main shaft by the nut, and a locking mechanism for locking the nut in the direction of rotation, the tool holding member being tightened to or loosened from the main shaft by rotating the main shaft in the forward or reverse direction with the nut locked by the locking mechanism, wherein the locking mechanism comprises a lock concave portion concavely provided on the outer circumferential face of the nut, and a lock pin to be pressed into contact with the outer circumferential face of the nut at a specified urging force during clamping or unclamping of a tool for holding the nut stationary, the lock concave portion and the lock pin being engaged with each other while the main shaft is rotated by a specified angle.

2. A tool clamping/unclamping device comprising a nut screwed around an end portion of a main shaft of a machine tool, and a tool holding member to be clamped to the end portion of the main shaft by the nut, the end portion of the main shaft being equipped with a male taper, a contact end face, and a power transmission key to be engaged with, respectively, a taper hole, a contact end face, and a keyway provided to the tool holding member, and the nut being equipped with an urging piece for carrying the tool holding member and urging the same toward the main shaft.

3. A tool clamping/unclamping device comprising a nut screwed around an end portion of a main shaft of a machine tool, and a tool holding member to be clamped to the end portion of the main shaft by the nut, the end portion of the main shaft being equipped with a contact end face and a power transmission key to be engaged with, respectively, a contact end face and a keyway provided to the tool holding member, and the nut allowing the main shaft to rotate by an arbitrary angle until the contact end face of the tool holding member is urged toward the main shaft at a specified torque, thereby tightening the tool holding member.

4. A tool clamping/unclamping device as claimed in claim 2, wherein the locking mechanism for locking the nut in the direction of rotation is provided on the side at which the machine tool is fixed.

5. A tool clamping/unclamping device as claimed in claim 3, wherein the locking mechanism for locking the nut in the direction of rotation is provided on the side at which the machine tool is fixed.

* * * * *